US008569916B2

(12) United States Patent  
Sugita et al.

(10) Patent No.: US 8,569,916 B2  
(45) Date of Patent: Oct. 29, 2013

(54) ELECTRICAL MACHINE APPARATUS

(75) Inventors: Satoshi Sugita, Nagano (JP); Yasushi Misawa, Nagano (JP); Yuqi Tang, Nagano (JP)

(73) Assignee: Sanyo Denki Co., Ltd., Tokyo (JP)

( * ) Notice: Subject to any disclaimer, the term of this patent is extended or adjusted under 35 U.S.C. 154(b) by 253 days.

(21) Appl. No.: 12/942,182

(22) Filed: Nov. 9, 2010

(65) Prior Publication Data

US 2011/0109173 A1    May 12, 2011

(30) Foreign Application Priority Data

Nov. 9, 2009  (JP) ................................ 2009-256215  
Oct. 12, 2010  (JP) ................................ 2010-229876

(51) Int. Cl.  
    *H02K 33/16* (2006.01)
(52) U.S. Cl.  
    USPC .............. 310/29; 310/30; 310/36; 310/12.15; 310/12.25; 310/12.31
(58) Field of Classification Search  
    USPC .............. 310/15, 24, 25, 12.01–12.02, 12.15, 310/12.17, 12.21–12.22, 12.24–12.27, 310/36–39, 28–30  
    See application file for complete search history.

(56) References Cited

U.S. PATENT DOCUMENTS

| 6,548,920 | B2 * | 4/2003 | Joong et al. ............... 310/12.21 |
| 6,717,297 | B2 * | 4/2004 | Sadarangani et al. ......... 310/14 |
| 7,078,832 | B2 * | 7/2006 | Inagaki et al. ............. 310/12.19 |
| 8,198,760 | B2 * | 6/2012 | Sugita et al. .............. 310/12.21 |
| 2005/0253464 | A1 * | 11/2005 | Sugita et al. ................ 310/12 |
| 2006/0091736 | A1 * | 5/2006 | Kim et al. ................... 310/12 |
| 2006/0115259 | A1 * | 6/2006 | Ito et al. .................... 396/75 |
| 2006/0273665 | A1 * | 12/2006 | Sugita et al. ................ 310/12 |

FOREIGN PATENT DOCUMENTS

| JP | 2005-328598 | 11/2005 |
| JP | 2006-121887 | 5/2006 |
| JP | 2006-320150 | 11/2006 |
| JP | 2006-340492 | 12/2006 |
| WO | 2004/036723 | 4/2004 |

OTHER PUBLICATIONS

Chinese Office Action with English Summary Translation, dated Jul. 5, 2013, 27 pages.

* cited by examiner

*Primary Examiner* — Burton Mullins  
*Assistant Examiner* — Eric Johnson  
(74) *Attorney, Agent, or Firm* — Rankin, Hill & Clark LLP

(57) ABSTRACT

A mover includes a permanent magnet array including permanent magnets magnetized in a perpendicular direction perpendicular to a motion direction of the mover such that magnetic poles having different polarities alternately appear on magnetic pole surfaces of the permanent magnets along the motion direction. A stator includes first and second magnetic pole portion assemblies disposed on both sides of the permanent magnet array in the perpendicular direction and each including magnetic pole portions facing the magnetic pole surfaces, and a single phase winding that excites the magnetic pole portions forming the first and second magnetic pole portion assemblies. The winding has a hollow structure formed by winding a winding conductor into a coil such that the magnetic pole portions included in the first magnetic pole portion assembly and the magnetic pole portions included in the second magnetic pole portion assembly are located in an internal space of the winding.

17 Claims, 28 Drawing Sheets

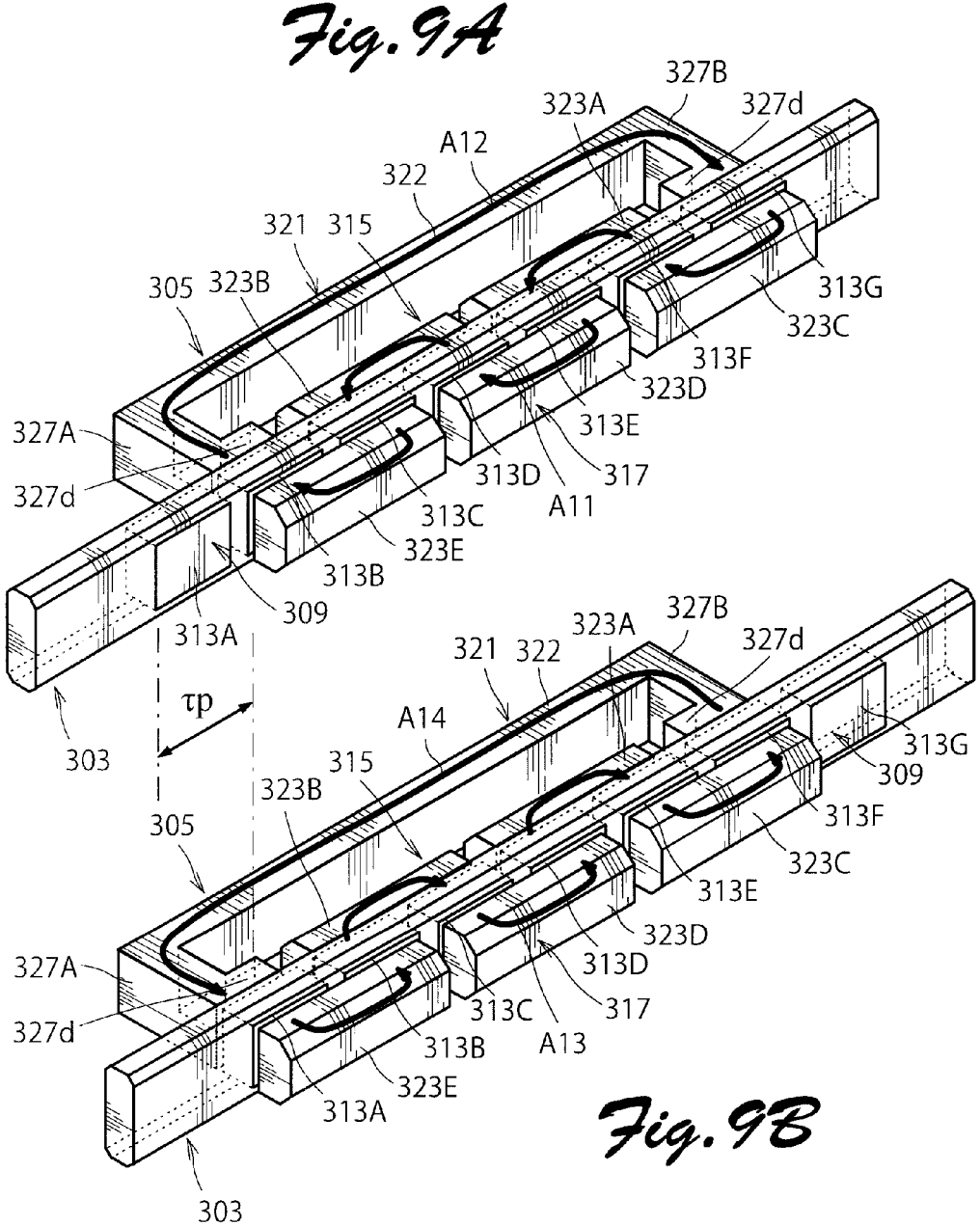

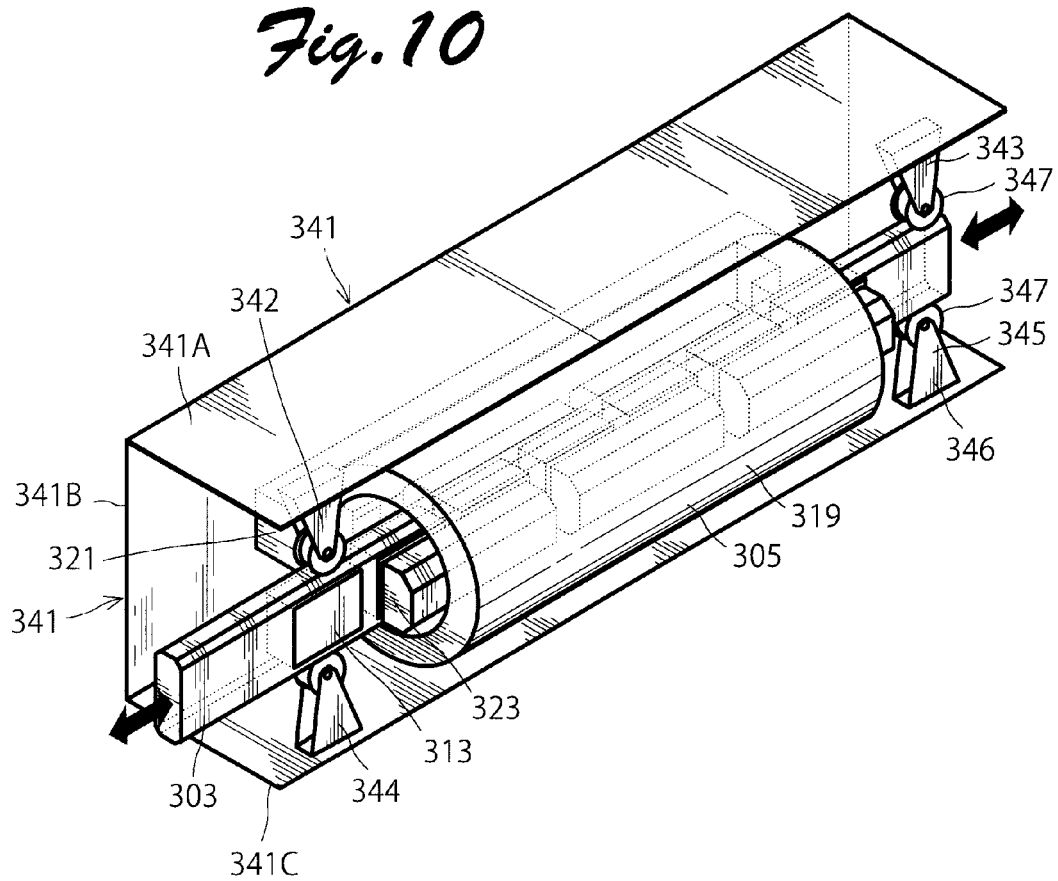

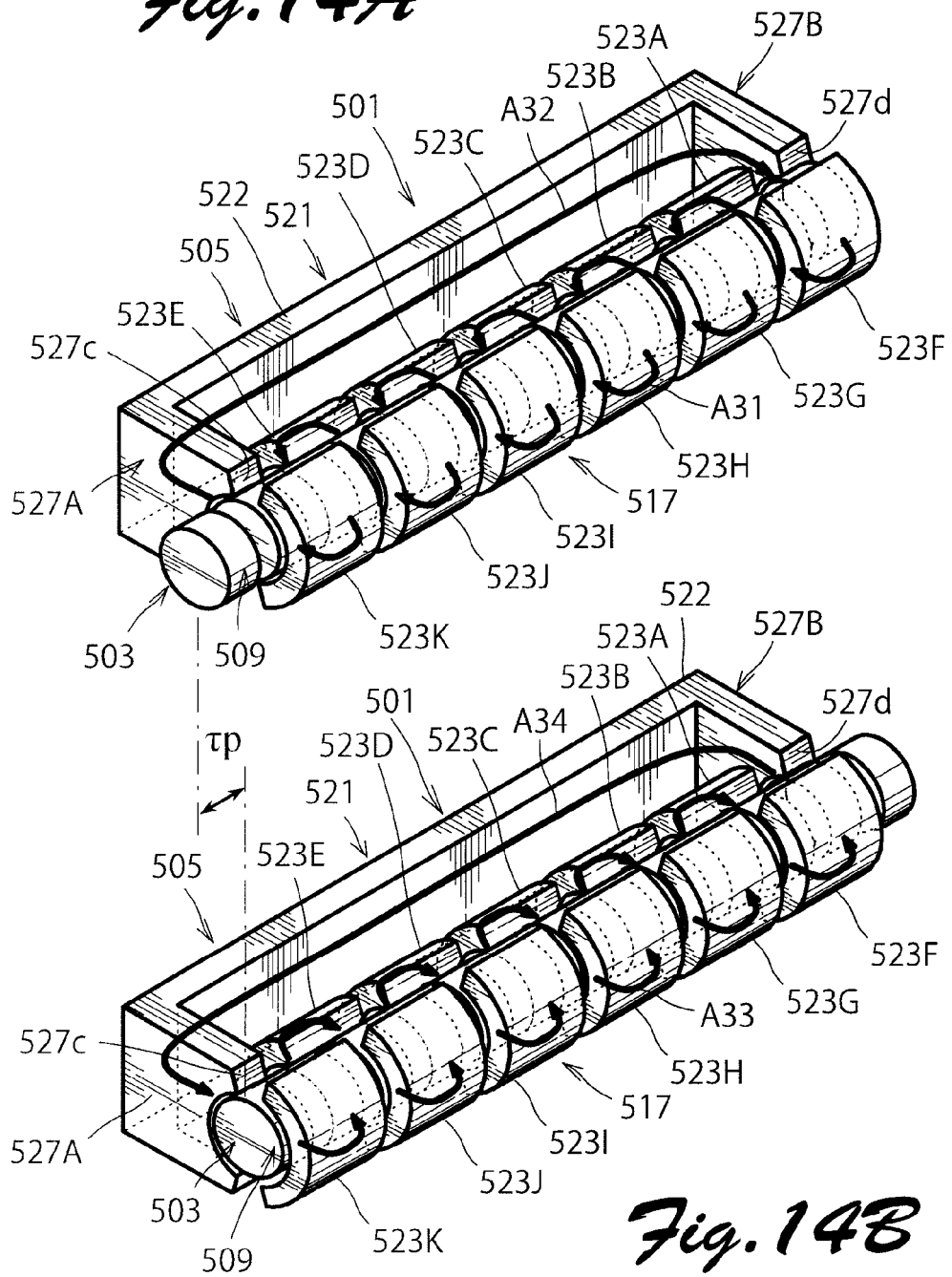

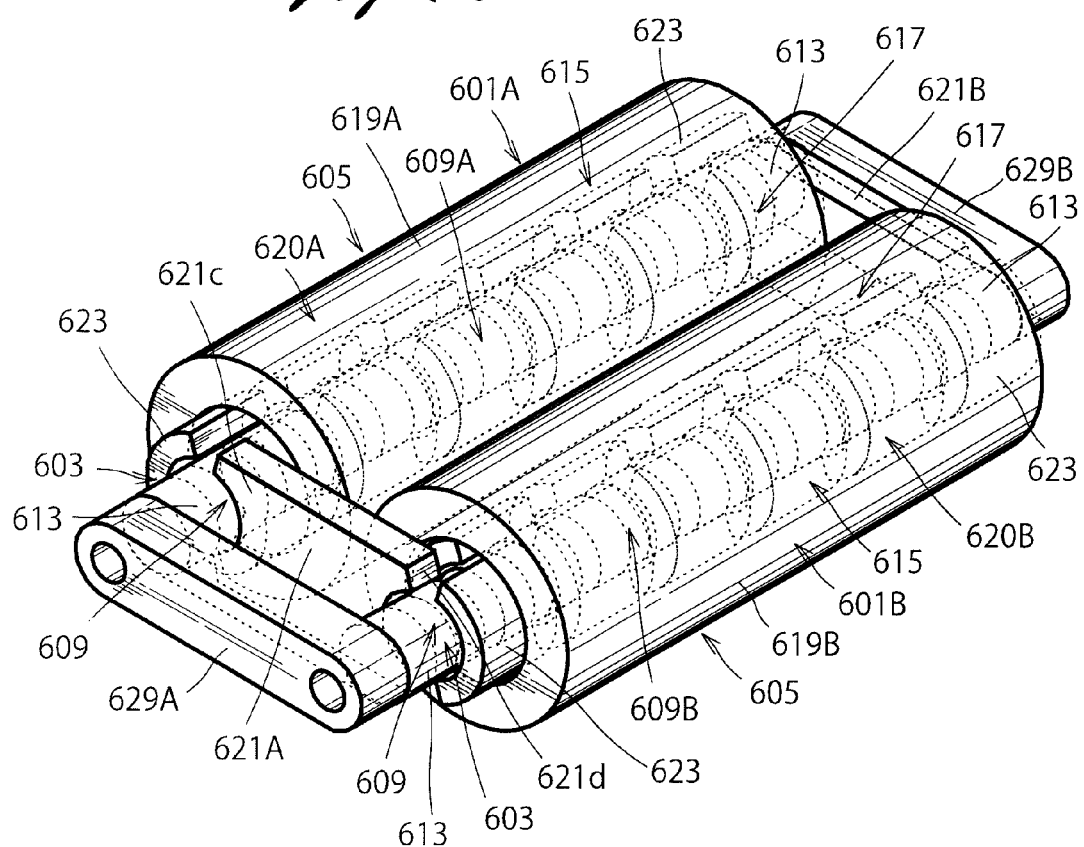

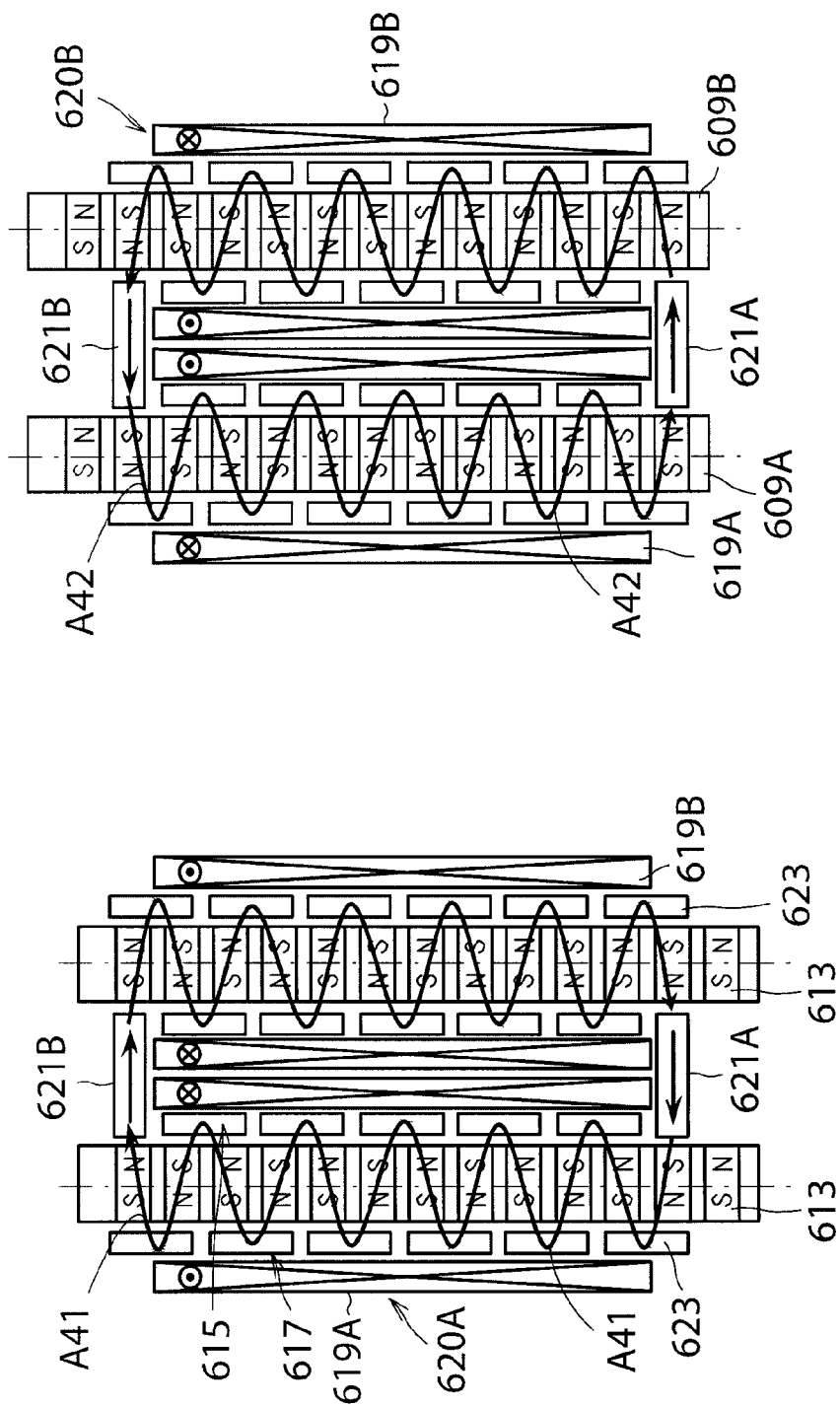

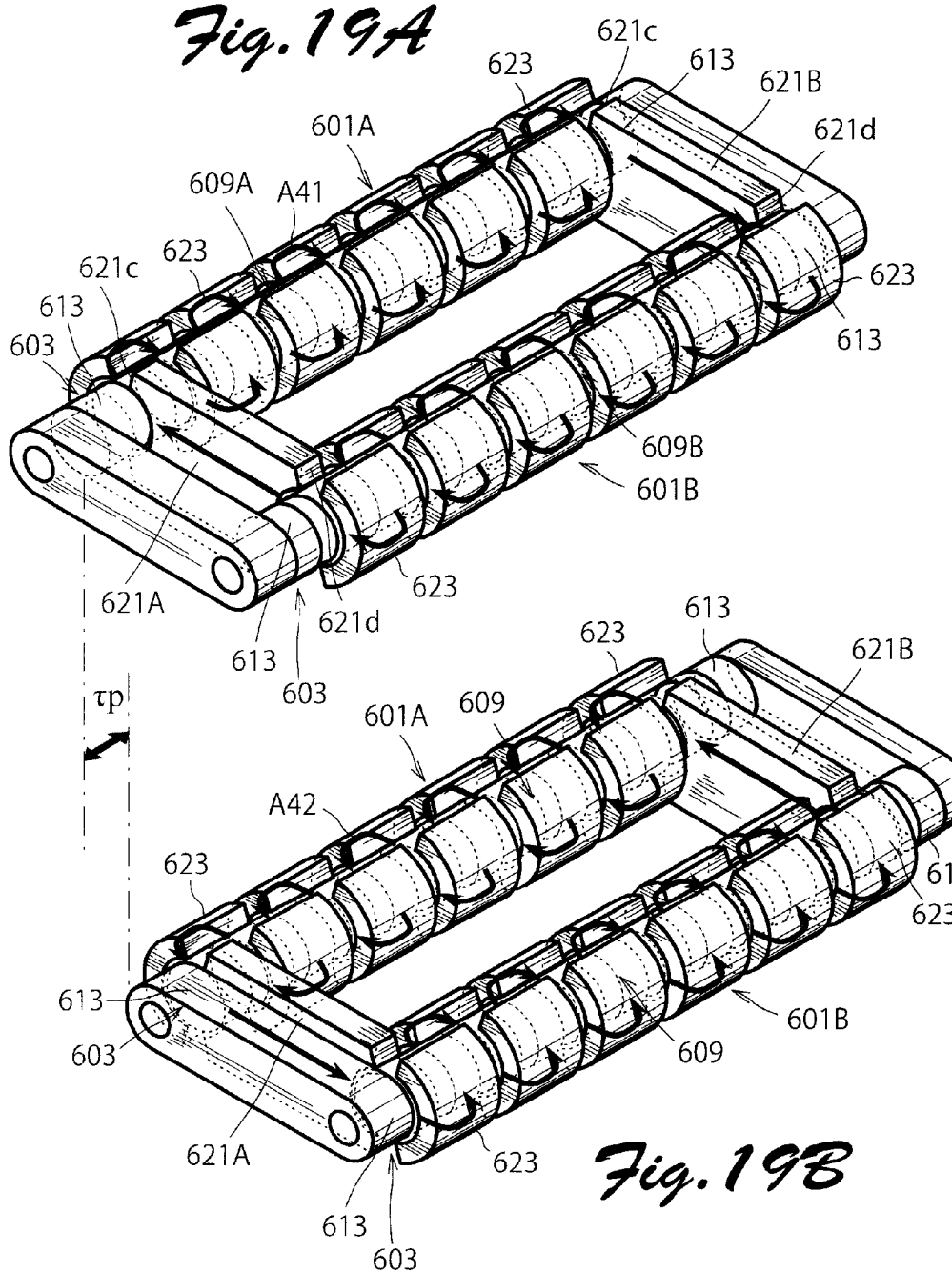

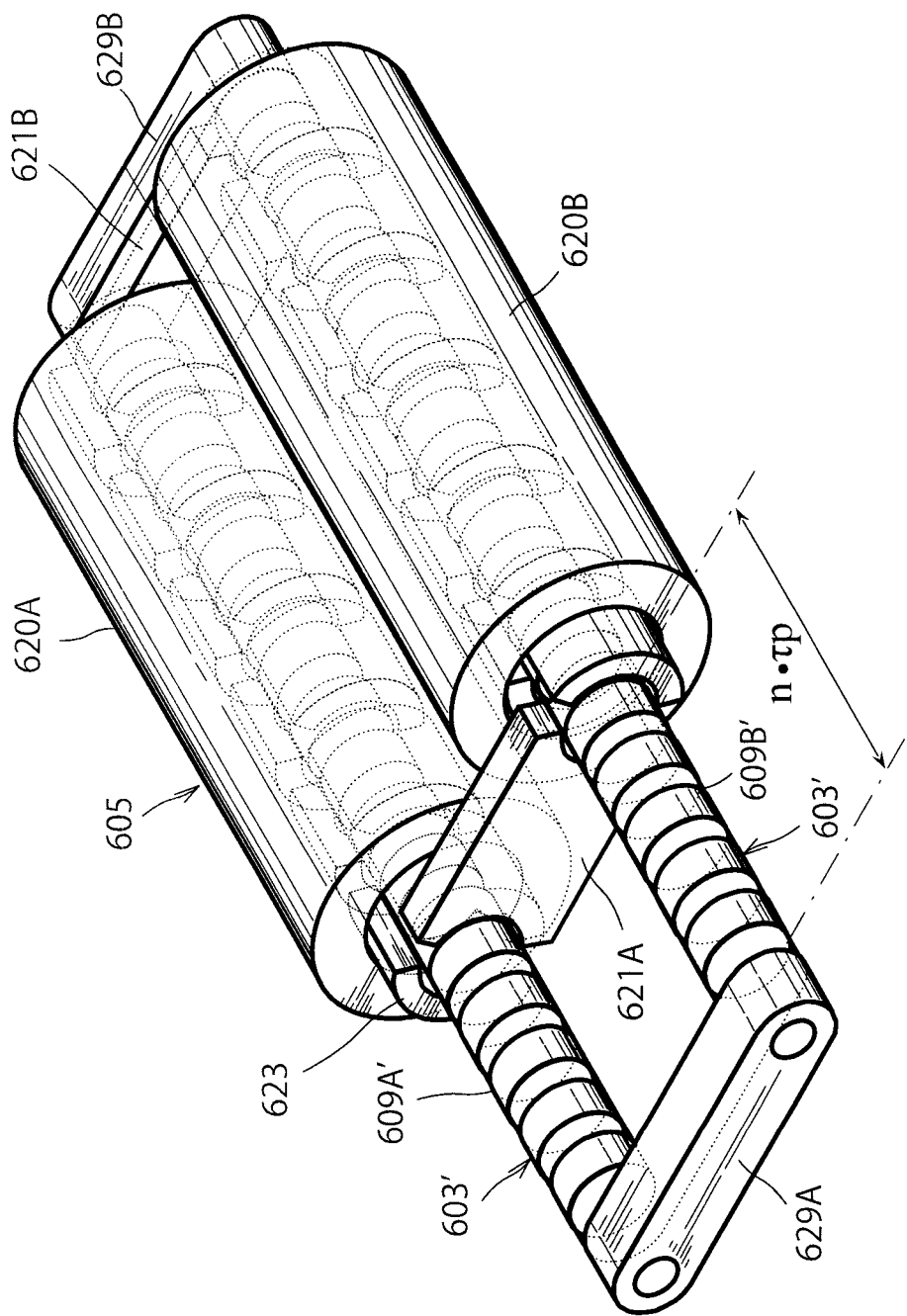

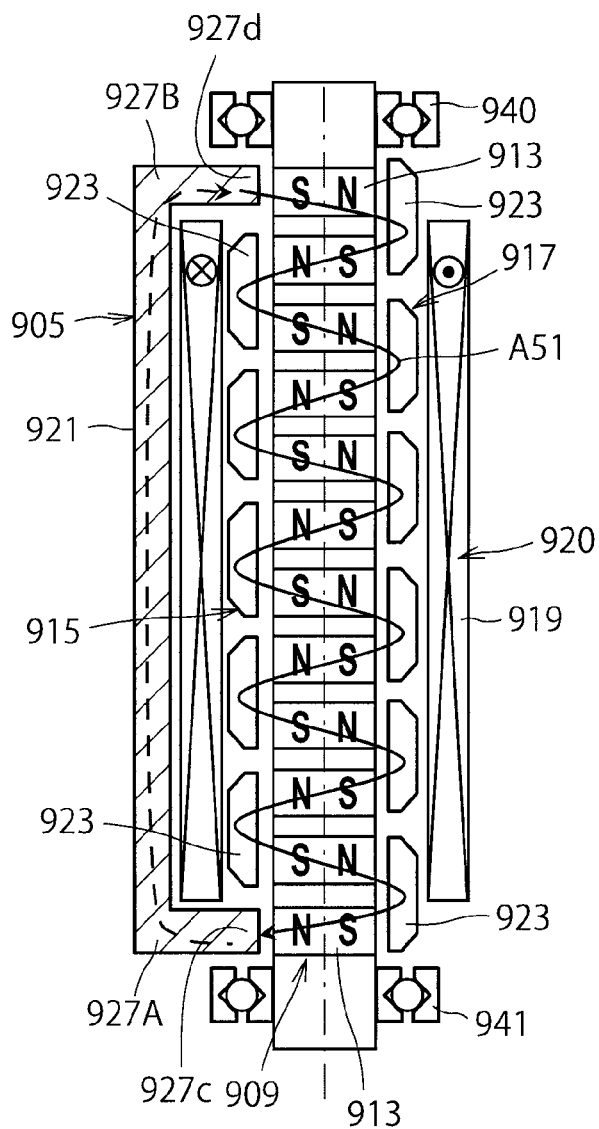
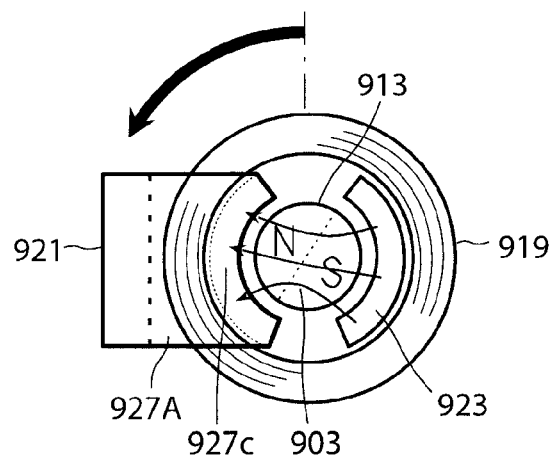

ELECTRICAL MACHINE APPARATUS

TECHNICAL FIELD

The present invention relates to an electrical machine apparatus such as an actuator, a motor, and a generator with an increased amount of windings.

BACKGROUND ART

Japanese Patent Application Publication No. 2006-320150 (JP2006-320150A) discloses a linear actuator (an electrical machine apparatus) including a stator and a mover that reciprocates with respect to the stator to generate vibration. The mover includes a pair of permanent magnet arrays each including a plurality of permanent magnets arranged in an array in a motion direction in which the mover reciprocates. The stator includes an armature including a stator core and an excitation winding. The stator core includes first and second magnetic pole portions facing magnetic pole surfaces of the plurality of permanent magnets, and a yoke portion coupled to the first and second magnetic pole portions via a coupling portion. The yoke portion is disposed outside the excitation winding in the radial direction of the mover.

SUMMARY OF THE INVENTION

In such an electrical machine apparatus as a linear actuator configured as described above, however, an increased amount of windings leads to increased length of the coupling portion, which tends to increase the magnetic resistance to cause magnetic saturation. Therefore, when the electrical machine apparatus is a motor or an actuator, there is a limit to the maximum thrust per size of the electrical machine apparatus. When the electrical machine apparatus is a generator, there is a limit to the maximum output per size of the electrical machine apparatus.

An object of the present invention is to provide an electrical machine apparatus with an enhanced maximum thrust or maximum output per size of the electrical machine apparatus achieved by increasing the amount of windings without significantly increasing the magnetic resistance.

Another object of the present invention is to provide an electrical machine apparatus that uses a reduced amount of iron.

A first aspect of the present invention provides an electrical machine apparatus (a motor, an actuator, or a generator) including a stator and a mover that reciprocates with respect to the stator.

One of the stator and the mover includes one or more permanent magnet arrays each including a plurality of permanent magnets arranged in an array in a motion direction in which the mover reciprocates. In the one or more permanent magnet arrays, each of the plurality of permanent magnets is magnetized such that magnetic poles having different polarities appear on two magnetic pole surfaces of the permanent magnet that are opposite each other in a perpendicular direction perpendicular to the motion direction, and the plurality of permanent magnets are disposed such that magnetic poles having different polarities alternately appear on magnetic pole surfaces of the permanent magnet array along the motion direction. The other of the stator and the mover includes one or more armature units each including a first magnetic pole portion assembly, a second magnetic pole portion assembly, and a single phase winding, and one or more yoke members. The first magnetic pole portion assembly includes two or more magnetic pole portions facing the magnetic pole surfaces of the permanent magnet array and disposed in the perpendicular direction and in one side of the permanent magnet array. The second magnetic pole portion assembly includes one or mere magnetic pole portions facing the magnetic pole surfaces of the permanent magnet array and disposed in the perpendicular direction and in the other side of the permanent magnet array. The one or more magnetic pole portions included in the second magnetic pole portion assembly are shifted or displaced in the motion direction with respect to the two or more magnetic pole portions included in the first magnetic pole portion assembly. The number of the magnetic pole portions of the first magnetic pole portion assembly and the number of the magnetic pole portions of the second magnetic pole portion assembly may be the same or different from each other. The single phase winding has a hollow structure formed by winding a winding conductor into a coil such that the two or more magnetic pole portions included in the first magnetic pole portion assembly and the one or more magnetic pole portions included in the second magnetic pole portion assembly are located in an internal space of the winding. The one or more yoke members are disposed such that magnetic flux flowing through the one or more permanent magnet arrays and the first and second magnetic pole portion assemblies forms a closed magnetic path.

When the electrical machine apparatus is a motor or an actuator, when a current flows through the winding in one direction, a magnetic path in which magnetic flux produced by the winding flows in a meandering manner to cross the magnetic pole portions included in the first magnetic pole portion assembly, the magnetic pole portions included in the second magnetic pole portion assembly, and the permanent magnet arrays and to circulate through the yoke members. Due to the flow of the magnetic flux, the magnetic pole portions and the permanent magnets in the one or more permanent magnet arrays are attracted toward and repulsed from each other to move the mover in one direction by the pitch of adjacent permanent magnets. Thereafter, when a current flows in the opposite direction through the winding, magnetic flux flows in the direction opposite to the direction in the foregoing state. Thus, the magnetic pole portions and the permanent magnet arrays are attracted toward and repulsed from each other to move the mover in the other direction (the direction in which the mover returns to the original position) by the pitch of adjacent permanent magnets. In this way, the mover reciprocates with respect to the stator. When the electrical machine apparatus is a generator, when the mover is reciprocated, magnetic flux from the permanent magnets alternately flows in opposite directions in a meandering manner, which induces a voltage in the winding to generate alternating electric power. In the present invention, the winding has a hollow structure formed by winding a winding conductor into a coil such that the magnetic pole portions of the first magnetic pole portion assembly and the magnetic pole portions of the second magnetic pole portion assembly, which are to be excited by the winding, are located in an internal space of the winding. When the electrical machine apparatus is a motor or a linear actuator, most of the magnetic flux produced by the winding directly flows through the magnetic pole portions of the first magnetic pole portion assembly and the magnetic pole portions of the second magnetic pole portion assembly in a meandering manner. When the electrical machine apparatus is a generator, the magnetic flux emitted from the one or more permanent magnet arrays sufficiently crosses the winding. Therefore, the amount of windings in the winding may be increased without significantly increasing the magnetic resistance. As a result, the maximum thrust or the maximum output per size of the electrical machine apparatus may be enhanced. According to the present invention, in addition, the magnetic pole portions may be formed to be smaller. Therefore, the amount of iron used may be reduced to reduce the size of the electrical machine apparatus.

Preferably, the magnetic pole portions included in one of the first and second magnetic pole portion assemblies may be shifted in the motion direction with respect to the magnetic pole portions included in the other magnetic pole portion assembly by a pitch (τp) between the centers of two adjacent permanent magnets of the plurality of permanent magnets forming the permanent magnet array. This configuration facilitates the meandering flow of magnetic flux which alternately passes through the magnetic pole portions in one assembly and the magnetic pole portions in the other assembly.

Defining a length of each of the magnetic pole portions forming the first and second magnetic pole portion assemblies as TL as measured in the motion direction, a relationship of τp<TL<2τp may be established. Accordingly, the mover may smoothly reciprocate with respect to the stator.

The permanent magnets may each be formed in a short plate shape and the permanent magnet arrays may each be formed in a long plate shape. For example, the plurality of permanent magnets may be fixed to or embedded in a support member having a predetermined mechanical strength to form the one or more permanent magnet arrays. In this case, the magnetic pole portions may each have a flat magnetic pole surface facing the permanent magnet array.

Alternatively, the permanent magnets may each be formed in a circular plate shape and the permanent magnet arrays may each be formed in a columnar shape. A columnar magnetic material may be magnetized from the radially outer side to form permanent magnets each formed in a circular plate shape in part of the magnetic material. Or, a plurality of permanent magnets formed by individually magnetizing magnetic materials each formed in a circular plate shape may be integrated or combined using a molding material to form permanent magnet arrays. In this case, the magnetic pole surface of each of the magnetic pole portions that faces the permanent magnet array may be formed in an arcuate shape.

The first and second magnetic pole portion assemblies and the winding may be molded with an electrical insulating resin. With this configuration, the magnetic pole portions and the winding may be easily integrated to facilitate installation of the magnetic pole portions and the winding during assembly.

When one permanent magnet array and one armature unit are used, the yoke member may be disposed outside the winding, the yoke member including a yoke body extending in the motion direction and a pair of auxiliary yokes provided at both ends of the yoke body and facing the permanent magnet array. By providing such auxiliary yokes, a closed magnetic path with little leakage of magnetic flux may be reliably formed. In this case, the pair of auxiliary yokes may each include an extending portion extending into the internal space of the winding. The extending portion may form at least part of the two or more magnetic pole portions of the first magnetic pole portion assembly. By providing such an extending portion, the extending portion of the yoke member may format least part of the magnetic pole portions to reduce the size of the electrical machine apparatus.

The pitch of the permanent magnets and the amount of shift between the magnetic pole portions of the first and second magnetic pole portion assemblies may meet the following conditions. That is, the pitch of the plurality of permanent magnets and the amount of shift between the two or more magnetic pole portions of the first magnetic pole portion assembly and the one or more magnetic pole portions of the second magnetic pole portion may be determined such that a meandering magnetic path is formed in part of the magnetic path, the meandering magnetic path sequentially passing through a first permanent magnet in the permanent magnet array, a first magnetic pole portion of the first magnetic pole portion assembly, a second permanent magnet in the permanent magnet array located adjacent to the first permanent magnet, a first magnetic pole portion of the second magnetic pole portion assembly, a third permanent magnet in the permanent magnet array located adjacent to the second permanent magnet, a second magnetic pole portion of the first magnetic pole portion assembly located adjacent to the first magnetic pole portion of the first magnetic pole portion assembly, and a fourth permanent magnet in the permanent magnet array located adjacent to the third permanent magnet. The first to fourth permanent magnets are meant to be four consecutive permanent magnets in the plurality of permanent magnets, and not particularly meant to be permanent magnets located at specific positions in the permanent magnet array.

The one or more permanent magnet arrays may include first and second permanent magnet arrays disposed in parallel with each other with a gap therebetween in the perpendicular direction and shifted or displaced from each other by an electrical angle of 180°, in which case the one or more armature units may include first and second armature units respectively corresponding to the first and second permanent magnet arrays. In this case, the first magnetic pole portion assembly of the first armature unit and the first magnetic pole portion assembly of the second armature unit may be disposed adjacent to each other, and the winding of the first armature unit and the winding of the second armature unit may be wound such that currents flowing through the windings of the first and second armature units have a phase difference corresponding to an electrical angle of 180°. The one or more yoke members may include first and second yoke members disposed on both sides of the first magnetic pole portion assembly of the first armature unit and the first magnetic pole portion assembly of the second armature unit in the motion direction to magnetically couple the first and second permanent magnet arrays to each other. With this configuration, a closed magnetic path in which a meandering magnetic path passing through the first permanent magnet array and the first and second magnetic pole portion assemblies of the first armature unit and a meandering magnetic path passing through the second permanent magnet array and the first and second magnetic pole portion assemblies of the second armature unit pass through the first and second yoke members is formed.

The first permanent magnet array and the second permanent magnet array may be mechanically coupled to each other, in which case one mover or stator is formed. With this configuration, the maximum thrust or the maximum output per size or for the size of the electrical machine apparatus may be doubled compared to when one permanent magnet array and one armature unit are provided. Alternatively, the first permanent magnet array and the second permanent magnet array may be disposed to be movable independently of each other, in which case components including the first and second permanent magnet arrays respectively serve as movers that vibrate in opposite directions. With this configuration, vibration of the mover including the first permanent magnet array and vibration of the mover including the second permanent magnet array cancel each other to reduce vibration of the entire electrical machine apparatus. Both the two movers may be connected to a load, or only one of the two movers may be connected to a load.

The mover may include the one or more permanent magnet arrays and the stator may include the one or more armature units, in which case the stator may be provided with a mover support mechanism that supports the mover to allow the mover to move in the motion direction. The configuration of the mover support mechanism may be determined appropriately in accordance with the configuration of the mover. The mover may be formed in a rail-like shape, in which case, in particular, the mover support mechanism may include a pair of guide mechanisms disposed outside the armature unit to contact the mover to allow the mover to move in the motion direction with little frictional resistance. With this structure, the mover may be firmly guided while reciprocating. The mover support mechanism may include a pair of plate spring members fixed to both ends of the mover in the motion direction, and a fixing structure that fixes the pair of plate spring members to the stator. Alternatively, the mover may be formed in a columnar shape, in which case the mover support mechanism may include a pair of thrust bearings disposed at both ends of the first and second magnetic pole portion assemblies of the armature units in the motion direction to support the mover. With this configuration, the mover may be supported using the existing thrust bearings.

A second aspect of the present invention provides an electrical machine apparatus including a stator and a mover that rotates with respect to the stator over a predetermined angular range. In the electrical machine apparatus, the mover includes a permanent magnet array including a plurality of permanent magnets arranged in an array. Each of the plurality of permanent magnets is magnetized such that magnetic poles having different polarities appear on two magnetic pole surfaces of that permanent magnet that are opposite each other in a perpendicular direction perpendicular to an extending direction in which the permanent magnet array extends, and the plurality of permanent magnets are disposed such that magnetic poles having different polarities alternately appear on magnetic pole surfaces of the permanent magnet array along the extending direction. The stator includes an armature unit including first and second magnetic pole portion assemblies and a winding, and a yoke member. The first magnetic pole portion assembly includes two or more magnetic pole portions facing the magnetic pole surfaces of the permanent magnet array and disposed in the perpendicular direction and in one side of the permanent magnet array. The second magnetic pole portion assembly includes two or more magnetic pole portions facing the magnetic pole surfaces of the permanent magnet array and disposed in the perpendicular direction and in the other side of the permanent magnet array. The two or more magnetic pole portions included in the second magnetic pole portion assembly are shifted in the extending direction with respect to the two or more magnetic pole portions included in the first magnetic pole portion assembly. The single phase winding has a hollow structure formed by winding a winding conductor into a coil such that the two or more magnetic pole portions included in the first magnetic pole portion assembly and the two or more magnetic pole portions included in the second magnetic pole portion assembly are located in an internal space of the winding. The yoke member is disposed such that magnetic flux flowing through the permanent magnet array and the first and second magnetic pole portion assemblies forms a closed magnetic path. The mover is formed in a columnar shape, and both ends of the mover in the extending direction are rotatably supported by a mover support mechanism. According to the second aspect of the present invention, a motor or an actuator with an increased amount of windings and with a mover that is capable of reciprocally rotating (swinging) over a predetermined angular range by applying an alternating current to a winding can be obtained. Such an electrical machine apparatus may serve as a generator with an increased amount of windings by reciprocally rotating (swinging) the mover within a predetermined angular range.

BRIEF DESCRIPTION OF THE DRAWINGS

FIGS. 9A and 9B illustrate how the electrical machine apparatus of FIG. 7 is operated.

FIG. 10 shows an exemplary support structure for the electrical machine apparatus according to the embodiment of FIGS. 7 to 9.

FIGS. 14A and 14B illustrate how the electrical machine apparatus of FIG. 12 is operated.

FIG. 16 is a perspective view schematically showing an internal structure of an electrical machine apparatus according to a seventh embodiment of the present invention.

FIGS. 18A to 18C show a closed magnetic path formed when currents with a phase difference of 180° respectively flow through windings of first and second armature units in the embodiment of FIG. 16.

FIGS. 19A and 19B illustrate how the electrical machine apparatus of FIG. 16 is operated.

FIG. 20 is a perspective view schematically showing an internal structure of an electrical machine unit of an electrical machine apparatus according to an eighth embodiment of the present invention.

FIGS. 27A to 27D illustrate magnetic flux flow and operation according to the embodiment of FIG. 26.

DESCRIPTION OF THE PREFERRED EMBODIMENTS

Figure 1:
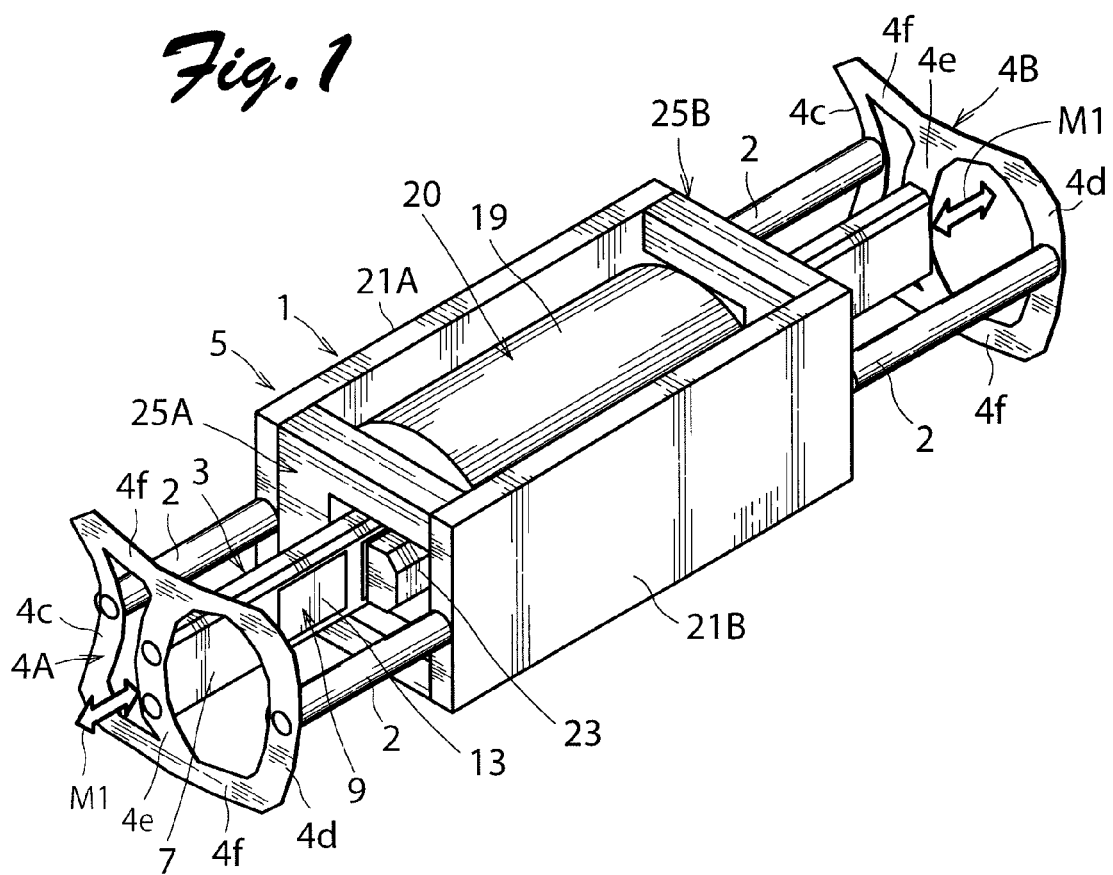
FIG. 1 is a perspective view schematically showing the structure of an electrical machine apparatus according to a first embodiment of the present invention.
Figure 2:
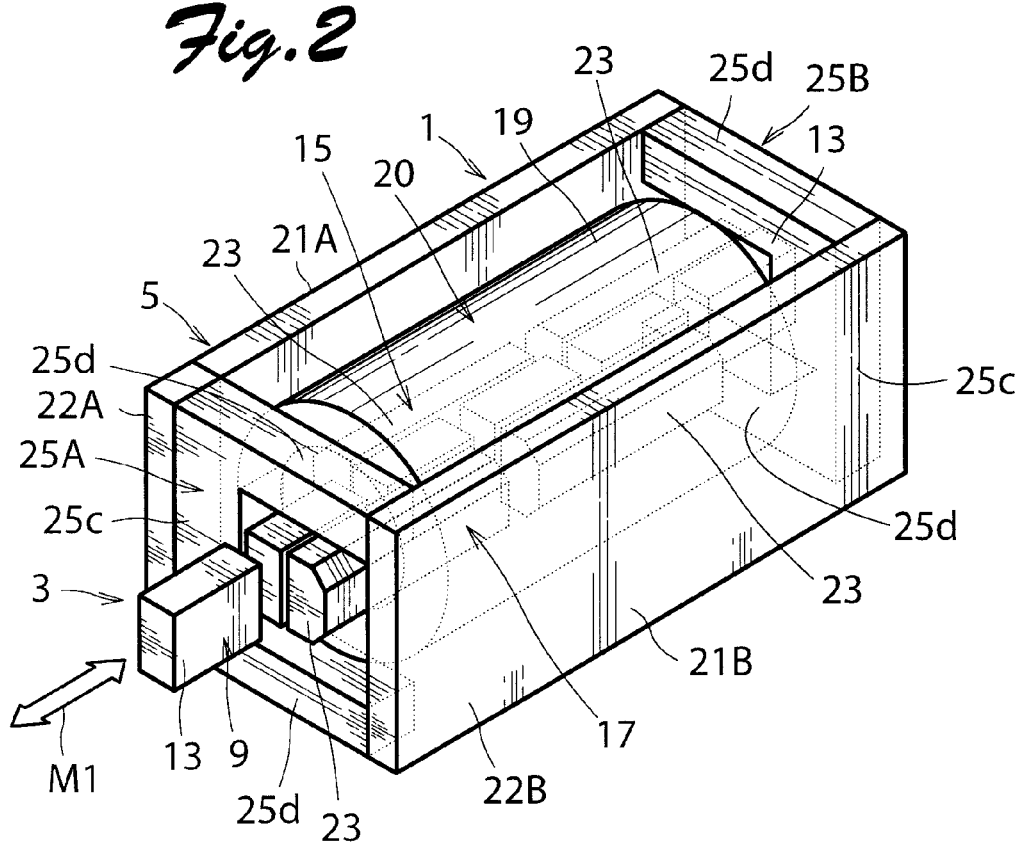
FIG. 2 is a perspective view schematically showing an internal structure of the electrical machine apparatus of FIG. 1.
Figure 3:
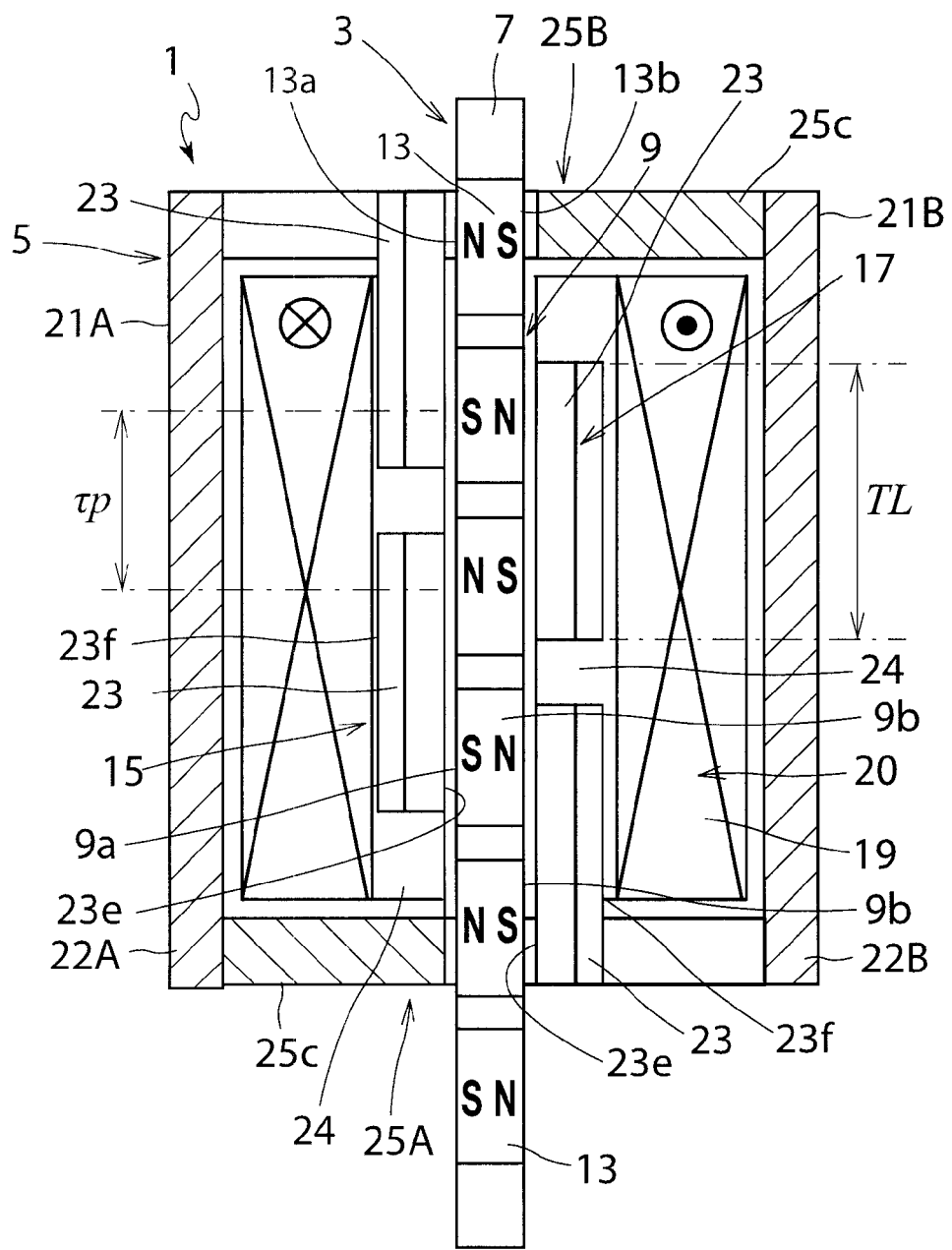
FIG. 3 is a cross-sectional view schematically showing the internal structure of the electrical machine apparatus of FIG. 1.

Electrical machine apparatuses according to embodiments of the present invention will be described in detail below with reference to the drawings. FIG. 1 is a perspective view showing the appearance of an electrical machine apparatus according to an embodiment of the present invention. While the electrical machine apparatus may theoretically be a linear motor, a linear actuator, or a linear vibration generator, the electrical machine apparatus is described as a motor or an actuator in each of the following embodiments. As shown in FIG. 1, the electrical machine apparatus according to the embodiment includes one electrical machine unit 1, four rod-like support members 2, and first and second plate spring members 4A and 4B. The electrical machine unit 1 includes a mover 3 and a stator 5. The mover 3 includes a rectangular frame member 7 and a permanent magnet array 9 disposed inside the frame member 7. The frame member 7 is formed from a non-magnetic material such as aluminum or a synthetic resin. When the frame member 7 is formed from aluminum, for example, the frame member 7 may be formed by insert molding with a plurality of permanent magnets 13 forming the permanent magnet array 9 embedded as inserts. FIGS. 2 and 3 are respectively a perspective view and a cross-sectional view schematically showing the internal structure of the electrical machine unit 1 of the electrical machine apparatus of FIG. 1. In FIG. 2, the frame member 7 is not shown for ease of understanding. In FIG. 3, the mover 3 is not hatched for ease of understanding. As shown in FIG. 3, the plurality of permanent magnets 13 are magnetized in a perpendicular direction perpendicular to a motion direction of the mover 3 such that magnetic poles having different polarities, north pole and south pole, alternately appear on magnetic pole surfaces of the plurality of permanent magnets 13 along the motion direction. In the embodiment, a non-magnetic material forming the frame member 7 is provided between two adjacent permanent magnets 13. In the embodiment, the permanent magnets 13 are each formed in a short plate shape, and the permanent magnet array 9 is formed in a long plate shape.

The stator 5 includes an armature unit 20 including a first magnetic pole portion assembly 15, a second magnetic pole portion assembly 17, and a single phase winding 19, and yoke members 21A and 21B. The first and second magnetic pole portion assemblies 15 and 17 each include two magnetic pole portions 23 arranged in an array on both sides of the permanent magnet array 9 in a perpendicular direction perpendicular to the motion direction. The winding 19 has a hollow structure formed by winding a winding conductor into a cylindrical shape. Each of the magnetic pole portions 23 is formed from iron which is a magnetic material, and formed in a long and narrow plate shape. The specific structure of the magnetic pole portions 23 will be described by affixing reference numerals to components of one magnetic pole portion 23 in FIG. 3. The magnetic pole portion 23 includes a magnetic pole surface 23e facing the permanent magnet array 9 with a narrow gap therebetween, and a winding facing surface 23f facing the winding 19 with a narrow gap therebetween. The magnetic pole surfaces 23e of the plurality of magnetic pole portions 23 of the first magnetic pole portion assembly 15 face magnetic pole surfaces 13a of the one or more permanent magnets 13 that appear on a side surface 9a of the permanent magnet array 9. The magnetic pole surfaces 23e of the plurality of magnetic pole portions 23 of the second magnetic pole portion assembly 17 face magnetic pole surfaces 13b of the one or more permanent magnets 13 that appear on a side surface 9b of the permanent magnet array 9 opposite the side surface 9a. The first and second magnetic pole portion assemblies 15 and 17 and the permanent magnet array 9 are configured such that defining the length of each of the magnetic pole portions 23 as TL as measured in the motion direction, and defining the pitch between the centers of two adjacent permanent magnets 13 of the plurality of permanent magnets 13 forming the permanent magnet array 9 as τp, the relationship of τD<TL<2τp is established. The two (p) magnetic pole portions 23 included in the first magnetic pole portion assembly 15 and the two (q) magnetic pole portions 23 included in the second magnetic pole portion assembly 17, which are to be excited by the winding 19, are disposed on both sides of the mover 3. The two magnetic pole portions 23 included in one of the first and second magnetic pole portion assemblies 15 and 17 are disposed to be shifted or displaced in position in the motion direction with respect to the two magnetic pole portions 23 included in the other magnetic pole portion assembly. In the embodiment, the two magnetic pole portions 23 included in one magnetic pole portion assembly are shifted in the motion direction by the pitch (τp) of the permanent magnets 13. In the embodiment, the number (p) of the magnetic pole portions 23 included in the first magnetic pole portion assembly 15 is equal to the number (q) of the magnetic pole portions 23 included in the second magnetic pole portion assembly 17.

The winding 19 has a hollow structure formed by winding a winding conductor into a coil such that the two magnetic pole portions 23 included in the first magnetic pole portion assembly 15 and the two magnetic pole portions 23 included in the second magnetic pole portion assembly 17 are located in an internal space of the winding 19. The four magnetic pole portions 23 and the winding 19 are integrally molded with an electrical insulating resin 24 such as an epoxy resin such that the magnetic pole surfaces 23e of the four magnetic pole portions 23 are exposed. See FIG. 3.

The yoke members 21A and 21B each include a yoke body 22A, 22B formed in a plate shape from iron which is a magnetic material, and an auxiliary yoke 25A, 25B. The yoke bodies 22A and 22B are disposed outside the winding 19 in the radial direction of the winding 19 to oppose each other in a direction, as referred to as a perpendicular direction, in which the first magnetic pole portion assembly 15, the permanent magnet array 9, and the second magnetic pole portion assembly 17 are disposed. In other words, the yoke bodies 22A and 22B are located on both sides of the winding 19 with the mover 3 and the winding 19 located between the yoke bodies 22A and 22B. The yoke bodies 22A and 22B respectively extend along the first and second magnetic pole portion assemblies 15 and 17. As shown in FIG. 2, both ends of the yoke body 22A and the yoke body 22B are coupled to each other by the auxiliary yokes 25A and 25B. The auxiliary yokes 25A and 25B each include a body portion 25c and a pair of elongated portions 25d extending from both ends of the body portion 25c. The body portion 25c of one auxiliary yoke 25A is coupled to the yoke body 22A, and extends from the yoke body 22A toward the permanent magnet array 9. As shown in FIG. 3, an end surface of the body portion 25c of the auxiliary yoke 25A is disposed side by side with the magnetic pole surfaces 23e of the magnetic pole portions 23 included in the first magnetic pole portion assembly 15, and magnetically forms part of the magnetic pole portions to be excited by the winding 19 as with the magnetic pole portions 23. End portions of the pair of elongated portions 25d are connected to the yoke body 22B of the yoke member 21B. The body portion 25c of the other auxiliary yoke 25B is coupled to the yoke body 22B, and extends from the yoke body 22B toward the permanent magnet array 9. An end surface of the body portion 25c of the auxiliary yoke 25B is disposed side by side with the magnetic pole surfaces 23e of the magnetic pole portions 23 included in the second magnetic pole portion assembly 17, and magnetically forms part of the magnetic pole portions to be excited by the winding 19 as with the magnetic pole portions 23. End portions of the pair of elongated portions 25d are connected to the yoke body 22A of the yoke member 21A. Magnetic flux produced by the winding 19 flows; through the yoke members 21A and 21B. When the electrical machine apparatus according to the embodiment is used as a generator, magnetic flux emitted from the permanent magnet array 9 flows through the yoke members 21A and 21B.

As shown in FIG. 1, the mover 3 of the electrical machine apparatus according to the embodiment is supported by the four support members 2 and the first and second plate spring members 4A and 4B. The four support members 2 are each formed in a columnar shape and a pair of the support members 2 are fixed to both end surfaces of the yoke bodies 22A and 22B in the motion direction. The pair of support members 2 disposed at both ends of the yoke bodies 22A and 22B are disposed to extend in the motion direction.

The first and second plate spring members 4A and 4B are formed in the same shape as each other by pressing a thin flexible metal plate. The first and second plate spring members 4A and 4B each include two support member connecting portions 4c and 4d, a frame member connecting portion 4e, and a pair of coupling portions 4f that respectively couple end portions of the support member connecting portions 4c and 4d and the frame member connecting portion 4e on both sides. End portions of the pair of support members 2 fixed to an end portion of the electrical machine unit 1 are respectively connected to the support member connecting portions 4c and 4d of the first plate spring member 4A. An end portion of the frame member 7 is connected to the frame member connecting portion 4e of the first plate spring member 4A. End portions of the pair of support members 2 fixed to the other end portion of the electrical machine unit 1 are respectively connected to the support member connecting portions 4c and 4d of the second plate spring member 4B. The other end portion of the frame member 7 is connected to the frame member connecting portion 4e of the second plate spring member 4B. In the electrical machine apparatus according to the embodiment, the flexure of the first and second plate spring members 4A and 4B allows the mover 3 to make reciprocal motion, or motion similar to vibration, by the pitch ($\tau p$) of the permanent magnets 13. Accordingly, the mover 3 is reciprocally supported by the support members 2 and the first and second plate spring members 4A and 4B.

Figure 4:
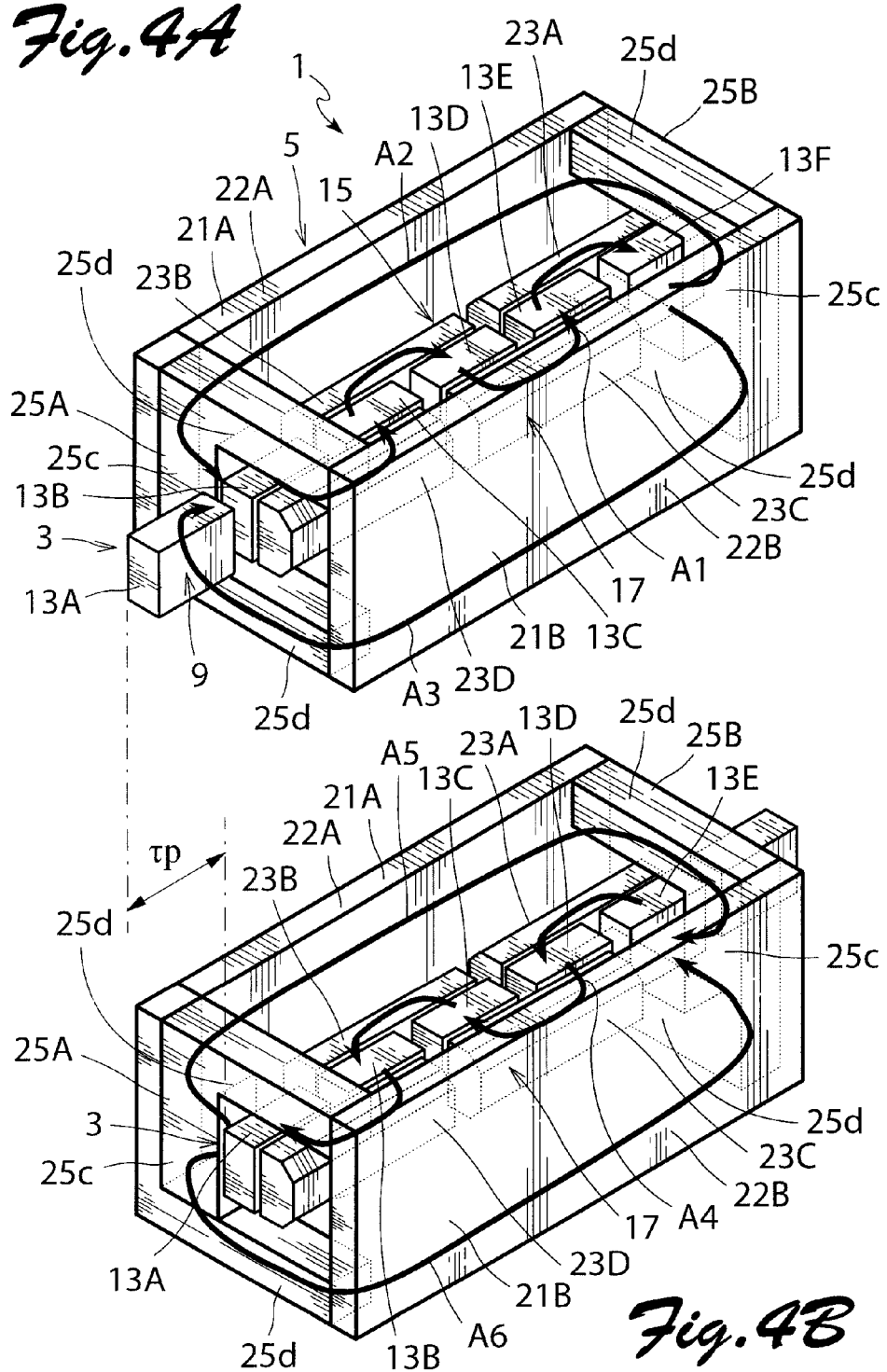
FIGS. 4A and 4B illustrate how the electrical machine apparatus of FIG. 1 is operated.

Next, the principle of operation of the electrical machine apparatus according to the embodiment will be described with reference to FIGS. 4A and 4B. In FIGS. 4A and 4B, the frame member 7 and the winding 19 are not shown for ease of understanding. Reference numerals 23A to 23D are affixed to the plurality of magnetic pole portions 23 for differentiation between the individual magnetic pole portions. Also, reference numerals 13A to 13F are affixed to the plurality of permanent magnets 13 for differentiation between the individual permanent magnets. When a current flows through the winding 19 in one direction, as shown in FIG. 4A, magnetic flux flows in a closed magnetic path that passes through the two magnetic pole portions 23A and 23B forming the first magnetic pole portion assembly 15, the two magnetic pole portions 23C and 23D forming the second magnetic pole portion assembly 17, and the permanent magnets 13 in the order of the magnetic pole portion 23D, the permanent magnet 13C, the magnetic pole portion 23B, the permanent magnet 13D, the magnetic pole portion 23C, the permanent magnet 13E, the magnetic pole portion 23A, the permanent magnet 13F, the auxiliary yoke 25B, the yoke body 22A, the auxiliary yoke 25A, the permanent magnet 13B, and the magnetic pole portion 23D, as indicated by arrows A1 and A2. In the winding 19, the magnetic flux forms a meandering magnetic path as indicated by arrow A1. Part of the magnetic flux flowing into the auxiliary yoke 25B flows in a closed magnetic path in the order of the body portion 25c of the auxiliary yoke 25B, the yoke body 22B, the pair of elongated portions 25d of the auxiliary yoke 25A, the body portion 25c of the auxiliary yoke 25A, the permanent magnet 13B, and the magnetic pole portion 23D as indicated by arrow A3. Due to the meandering magnetic path A1, magnetic poles respectively appear on the magnetic pole surfaces 23e of the magnetic pole portions 23D to 23A. These magnetic poles and the magnetic poles appearing on the magnetic pole surfaces of the permanent magnets 13 are attracted toward and repulsed from each other to move the mover 3 in the direction from the auxiliary yoke 25A to the auxiliary yoke 25B by the pitch ($\tau p$) of the plurality of permanent magnets 13 as shown in FIG. 4B. Thereafter, in the state shown in FIG. 4B, a current flows through the winding 19 in the direction opposite to the state shown in FIG. 4A. Then, as shown in FIG. 4B, magnetic flux flows in a closed magnetic path, or a magnetic path in the direction opposite to the state shown in FIG. 4A, in the order of the magnetic pole portion 23A, the permanent magnet 13D, the magnetic pole portion 23C, the permanent magnet 13C, the magnetic pole portion 23B, the permanent magnet 13B, the magnetic pole portion 23D, the permanent magnet 13A, the body portion 25c of the auxiliary yoke 25A, the yoke body 22A, the pair of elongated portions 25d of the auxiliary yoke 25B, the body portion 25c of the auxiliary yoke 25B, the permanent magnet 13E, and the magnetic pole portion 23A as indicated by arrows A4 and A5. Part of the magnetic flux flowing into the auxiliary yoke 25A flows in the order of the body portion 25c of the auxiliary yoke 25A, the pair of elongated portions 25d of the auxiliary yoke 25A, the yoke body 22B, the body portion 25c of the auxiliary yoke 25B, the permanent magnet 13E, and the magnetic pole portion 23A as indicated by arrow A6. Due to the meandering magnetic path A4, magnetic poles having polarities opposite to those in the foregoing state respectively appear on the magnetic pole surfaces 23e of the magnetic pole portions 23D to 23A. These magnetic poles and the magnetic poles appearing on the magnetic pole surfaces of the permanent magnets 13 are attracted toward and repulsed from each other to move the mover 3 in the direction from the auxiliary yoke 25B to the auxiliary yoke 25A by the pitch (τp) of the plurality of permanent magnets 13 to the position shown in FIG. 4A. The mover 3 reciprocates or vibrates with respect to the stator 5 by repeatedly switching between these states.

According to the electrical machine apparatus of the embodiment, the winding 19 has a hollow structure formed by winding a winding conductor into a coil such that the magnetic pole portions 23 of the first magnetic pole portion assembly 15 and the magnetic pole portions 23 of the second magnetic pole portion assembly 17, which are to be excited by the winding 19, are located in an internal space of the winding 19. Thus, much of the magnetic flux produced by the winding 19 directly flows through the magnetic pole portions 23 of the first magnetic pole portion assembly 15 and the magnetic pole portions 23 of the second magnetic pole portion assembly 17 in a meandering manner. Therefore, the magnetic resistance is not significantly increased. In addition, the amount of windings in the winding 19 may be increased. As a result, the maximum thrust for the size of the electrical machine apparatus may be enhanced. Moreover, part of the auxiliary yokes 25A and 25B magnetically forms part of the magnetic pole portions 23. Therefore, the magnetic pole portions 23 can be formed to be smaller, which reduces the amount of iron used and the size of the electrical machine apparatus.

The electrical machine apparatus configured as shown in FIGS. 1 to 4 may also function as a generator by reciprocating the mover 3 with an external force. When the electrical machine apparatus functions as a generator, magnetic flux emitted from the permanent magnets 13 flows in a closed magnetic path as meandering magnetic flux shown in FIG. 4 to induce a voltage in the winding 19.

Figure 5:
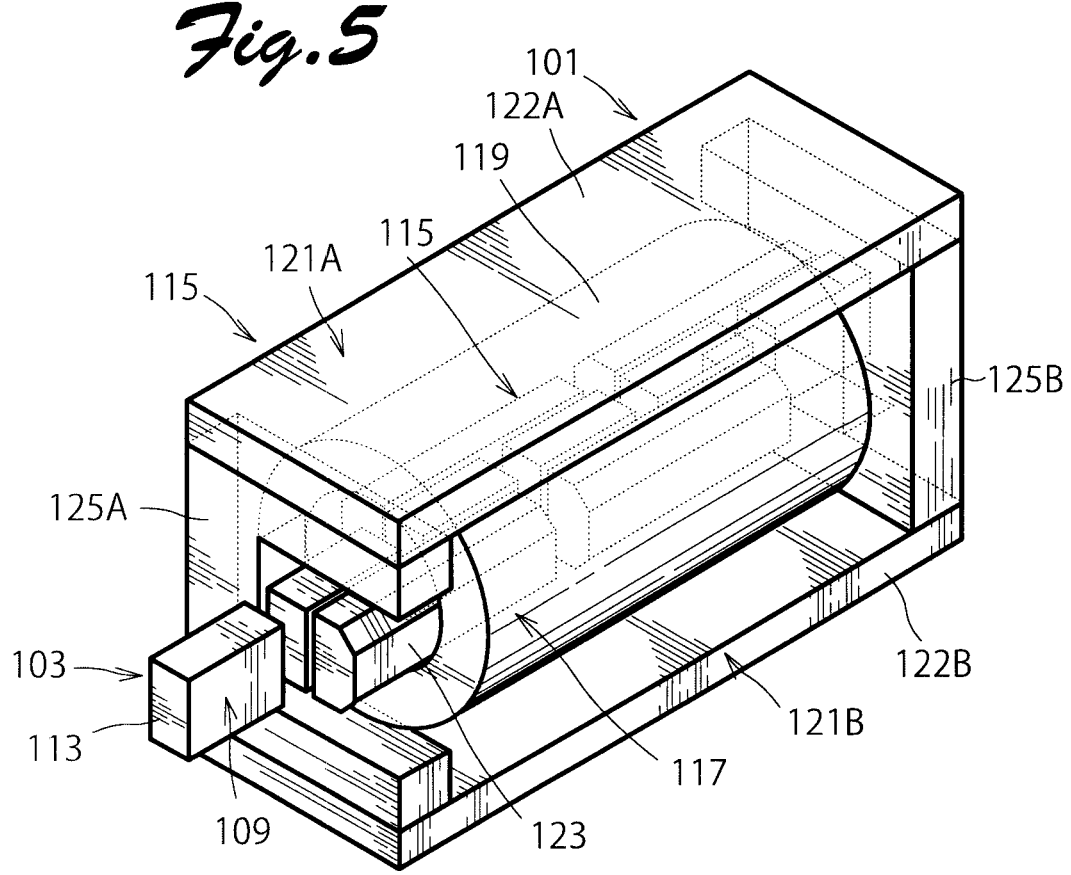
FIG. 5 is a perspective view schematically showing an internal structure of an electrical machine apparatus according to a second embodiment of the present invention.

FIG. 5 is a perspective view schematically showing the internal structure of an electrical machine unit of an electrical machine apparatus according to a second embodiment of the present invention. A mover support mechanism including the support member 2 and the first and second plate spring members 4A and 4B shown in FIG. 1 may also be used in the embodiments below. The electrical machine apparatus according to the embodiment has the same structure as the electrical machine apparatus shown in FIGS. 1 to 4 except for the structure of a pair of yoke members 121A and 121B. Therefore, components that are the same as those of the electrical machine apparatus shown in FIGS. 1 to 4 are denoted by reference numerals obtained by adding 100 to the reference numerals affixed to their counterparts in FIGS. 1 to 4 and their descriptions are omitted. Yoke bodies 122A and 122B of the yoke members 121A and 121B of the electrical machine apparatus according to the embodiment are disposed outside a winding 119 in the radial direction of the winding 119 to oppose each other in a direction perpendicular to the direction in which a first magnetic pole portion assembly 115, a permanent magnet array 109, and a second magnetic pole portion assembly 117 face each other.

Figure 6:
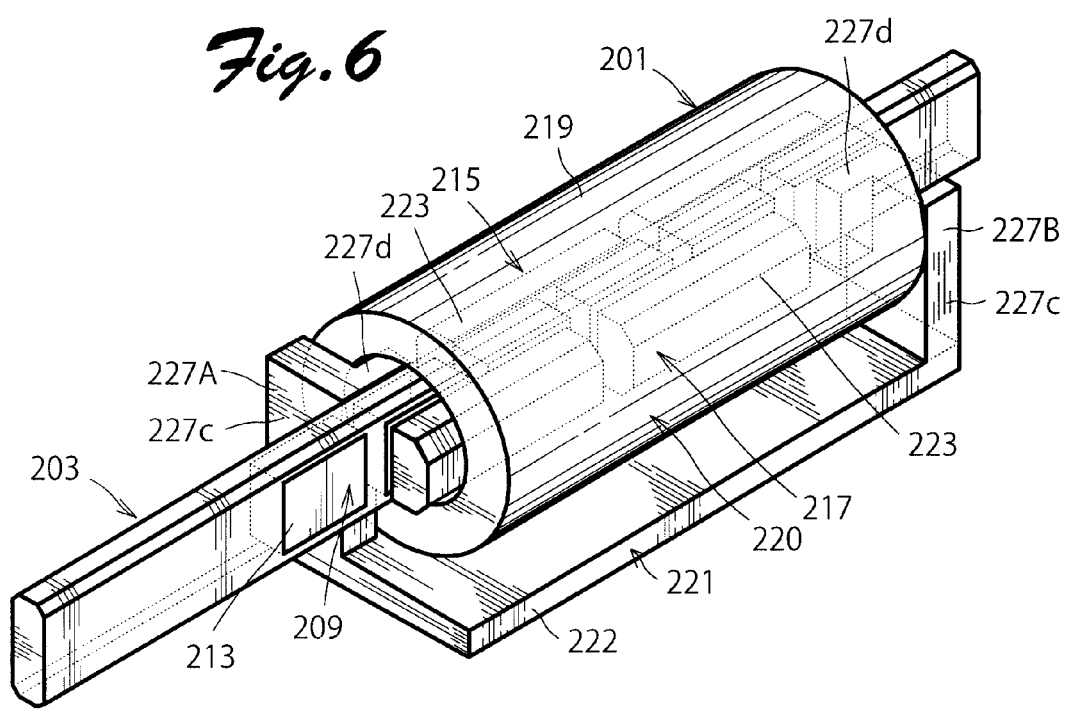
FIG. 6 is a perspective view schematically showing an internal structure of an electrical machine apparatus according to a third embodiment of the present invention.

FIG. 6 is a perspective view schematically showing the internal structure of an electrical machine unit of an electrical machine apparatus according to a third embodiment of the present invention. The electrical machine apparatus according to the embodiment has the same structure as the electrical machine apparatus shown in FIGS. 1 to 4 except for a yoke member. Therefore, components that are the same as those of the electrical machine apparatus shown in FIGS. 1 to 4 are denoted by reference numerals obtained by adding 200 to the reference numerals affixed to their counterparts in FIGS. 1 to 4 and their descriptions are omitted. In a yoke member 221 of the electrical machine apparatus according to the embodiment, a yoke body 222 is disposed only on one outer side of a winding 219 in the radial direction of the winding 219 in a direction perpendicular to the direction in which a first magnetic pole portion assembly 215, a permanent magnet array 209, and a second magnetic pole portion assembly 217 face each other. A pair of auxiliary yokes 227A and 227B are disposed at two opposite corners of the yoke body 222. The auxiliary yokes 227A and 227B each include a body portion 227c and an extending portion 227d extending from an end portion of the body portion 227 to face the permanent magnet array 209. The extending portion 227d extends into the winding 219. In one auxiliary yoke 227A, the body portion 227c is connected to the yoke body 222, and the extending portion 227d is disposed side by side with the magnetic pole portions 223 included in the first magnetic pole portion assembly 215. The extending portion 227d of the auxiliary yoke 227A forms part of the magnetic pole portions to be excited by the winding 219 as with the magnetic pole portions 223. In the other auxiliary yoke 227B, the body portion 227c is connected to the yoke body 222, and the extending portion 227d is disposed side by side with the magnetic pole portions 223 included in the second magnetic pole portion assembly 217. The extending portion 227d of the auxiliary yoke 227B forms part of the magnetic pole portions included in the second magnetic pole portion assembly 217. According to the electrical machine apparatus of the embodiment, only one yoke body 222 is used, and the extending portions 227d form part of the magnetic pole portions. Thus, the amount of iron of the yoke member 221 may be reduced to reduce the size of the electrical machine apparatus. If the extending portions 227d are utilized as part of the magnetic pole portions as in the embodiment of FIG. 6, the size of the electrical machine apparatus may be further reduced by providing one independent magnetic pole portion 223 in each of the first magnetic pole portion assembly 215 and the second magnetic pole portion assembly 217. The electrical machine apparatus according to the embodiment also may be utilized as a generator.

Figure 7:
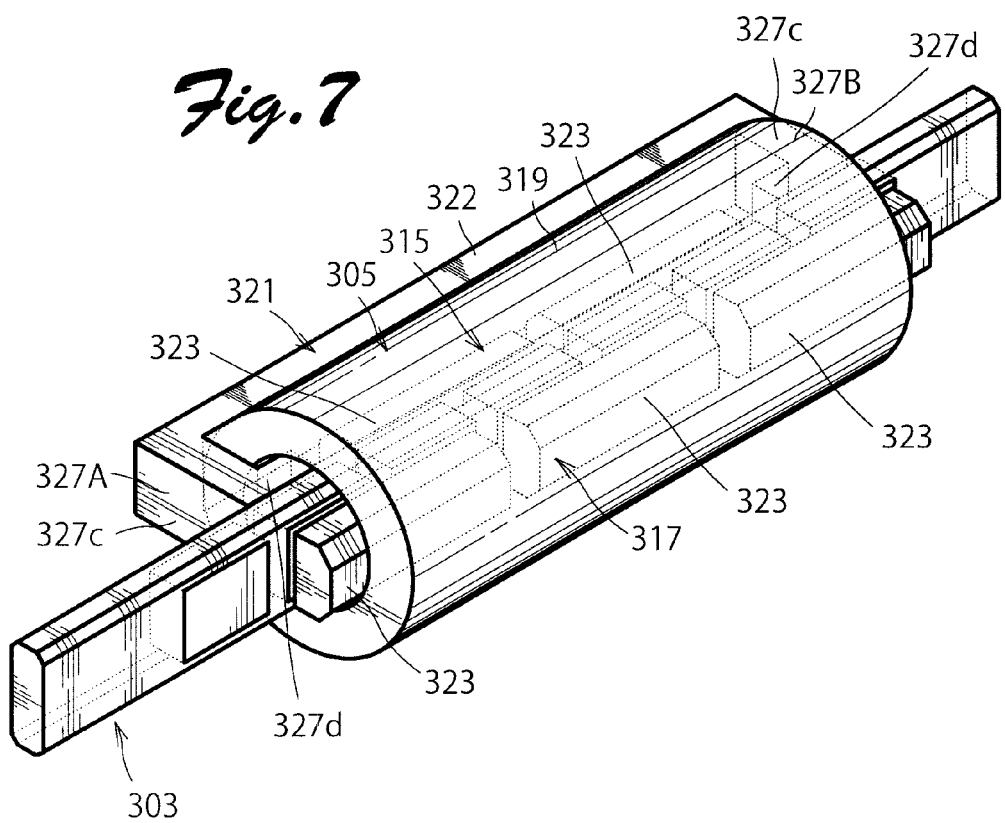
FIG. 7 is a perspective view schematically showing an internal structure of an electrical machine apparatus according to a fourth embodiment of the present invention.
Figure 8:
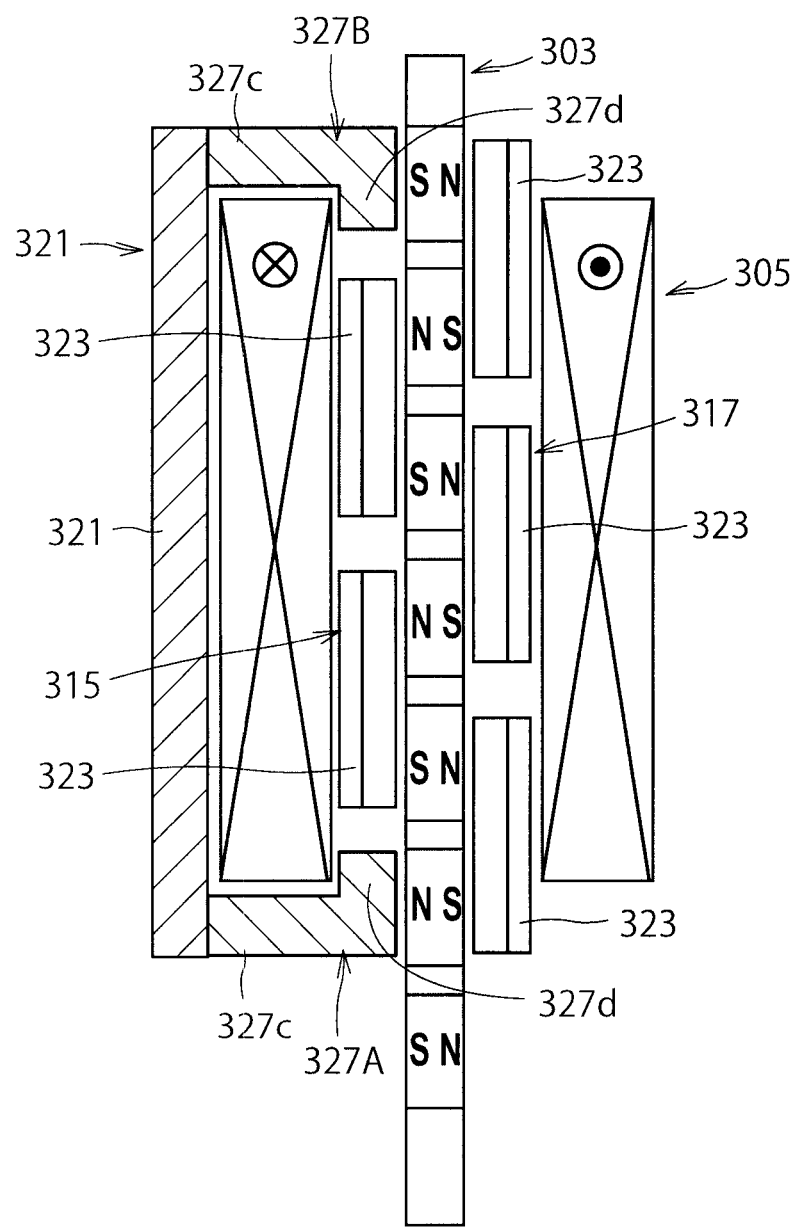
FIG. 8 is a cross-sectional view schematically showing the internal structure of the electrical machine apparatus of FIG. 7.

FIGS. 7 and 8 are respectively a perspective view and a cross-sectional view schematically showing the internal structure of an electrical machine unit of an electrical machine apparatus according to a fourth embodiment of the present invention. The electrical machine apparatus according to the embodiment has the same structure as the electrical machine apparatus shown in FIGS. 1 to 4 except for the number of magnetic pole portions and a yoke member. Therefore, components that are the same as those of the electrical machine apparatus shown in FIGS. 1 to 4 are denoted by reference numerals obtained by adding 300 to the reference numerals affixed to their counterparts in FIGS. 1 to 4 and their descriptions are omitted. In the electrical machine apparatus according to the embodiment, a first magnetic pole portion assembly 315 includes two magnetic pole portions 323. A second magnetic pole portion assembly 317 includes three magnetic pole portions 323.

In a yoke member 321 of the electrical machine apparatus according to the embodiment, a yoke body 322 is disposed in a direction in which the first magnetic pole portion assembly 315, the permanent magnet array 309, and the second magnetic pole portion assembly 317 face each other and outside the winding 319 in the radial direction of the winding 319. The yoke body 322 is formed in a long and narrow plate shape. Auxiliary yokes 327A and 327B are integrally disposed at both ends of the yoke body 322. The auxiliary yokes 327A and 327B each include a body portion 327c and an extending portion 327d extending at a substantially right angle from an end portion of the body portion 327c. In one auxiliary yoke 327A, the body portion 327c is connected to one end portion of the yoke body 322. The extending portion 327d is disposed side by side with one magnetic pole portion 23 of the two magnetic pole portions 323 included in the first magnetic pole portion assembly 315. The extending portion 327d of the auxiliary yoke 327A forms part of the magnetic pole portions to be excited by the winding 319 as with the magnetic pole portions 323. In the other auxiliary yoke 327B, the body portion 327c is connected to the other end portion of the yoke body 321. The extending portion 327d is disposed side by side with the other magnetic pole portion 323 of the two magnetic pole portions 323 included in the first magnetic pole portion assembly 315. The extending portion 327d of the auxiliary yoke 327B also forms part of the magnetic pole portions to be excited by the winding 319. Each of the extending portion 327d of the auxiliary yoke 327A and the extending portion 327d of the auxiliary yoke 327B has half the length of each of the magnetic pole portions 323. The two extending portions 327d each form magnetically a short magnetic pole portion 323.

Next, operation of the electrical machine apparatus according to the embodiment will be described. When a current flows through the winding 319 in one direction, as shown in FIG. 9A, magnetic flux flows in a closed magnetic path through the magnetic pole portions 327d and 323A to 323E and the permanent magnets 313A to 313G in the order of the extending portion 327d of the auxiliary yoke 327B, the permanent magnet 313G, the magnetic pole portion 323C, the permanent magnet 313F, the magnetic pole portion 323A, the permanent magnet 313E, the magnetic pole portion 323D, the permanent magnet 313D, the magnetic pole portion 323B, the permanent magnet 313C, the magnetic pole portion 323E, the permanent magnet 313B, the extending portion 327d of the auxiliary yoke 327A, and the yoke body 322 as indicated by arrows A11 and A12. Due to the magnetic flux passing through the closed magnetic path, magnetic poles appear on magnetic pole surfaces of the magnetic pole portions 327d and 323A to 323E. These magnetic poles and the magnetic poles appearing on the magnetic pole surfaces of the permanent magnets 313A to 313G are attracted toward and repulsed from each other to move the mover 303 in the direction from the auxiliary yoke 327A to the auxiliary yoke 327B by the pitch (τp) of the plurality of permanent magnets 313 as shown in FIG. 9B.

In the state shown in FIG. 9B, when a current flows through the winding 319 in the direction opposite to the state shown in FIG. 9A, a closed magnetic path in the direction opposite to the closed magnetic path shown in FIG. 9A is formed. In the closed magnetic path, magnetic flux flows in the order of the extending portion 327d of the auxiliary yoke 327A, the permanent magnet 313A, the magnetic pole portion 323E, the permanent magnet 313B, the magnetic pole portion 323B, the permanent magnet 313C, the magnetic pole portion 323D, the permanent magnet 313D, the magnetic pole portion 323A, the permanent magnet 313E, the magnetic pole portion 323C, the permanent magnet 313F, the extending portion 327d of the auxiliary yoke 327B, and the yoke body 322, as indicated by arrows A13 and A14, in the direction opposite to the direction of the magnetic flux shown in FIG. 9A. Due to the magnetic flux passing through the closed magnetic path, magnetic poles having polarities opposite to those in the state of FIG. 9A appear on magnetic pole surfaces of the magnetic pole portions 327d and 323A to 323E. These magnetic poles and the magnetic poles appearing on the magnetic pole surfaces of the permanent magnets 313A to 313G are attracted toward and repulsed from each other to move the mover 303 in the direction from the auxiliary yoke 327B to the auxiliary yoke 327A by the pitch (τp) of the plurality of permanent magnets 313 to the position shown in FIG. 9A. The mover 303 reciprocates with respect to the stator 305 by repeatedly switching between these states.

According to the electrical machine apparatus of the embodiment, the shape of the yoke member 321 is reduced. Therefore, the amount of iron of the yoke member 321 may be reduced to reduce the size of the electrical machine apparatus. The electrical machine apparatus according to the embodiment also may function as a generator by vibrating the mover 303 with external motive power.

FIG. 10 shows an exemplary support structure for the electrical machine apparatus according to the embodiment of FIGS. 7 to 9. In the support structure shown in FIG. 10, the stator 305 is fixed to a structure 341 formed by first to third wall portions 341A to 341C, and the mover 303 is supported by the structure 341. The stator 305 is fixed to the structure 341 by fixing the yoke member 321 to the second wall portion 341B of the structure 341. The mover 303 is slidably supported by casters 342 and 343 fixed to the first wall portion 341A of the structure 341 and casters 344 and 345 fixed to the third wall portion 341C. The casters 342 to 345 are each formed by attaching a wheel 347 to a leg portion 346. The wheel 347 includes a pair of flange portions to be fitted with the rail-like mover 303.

Figure 11A:
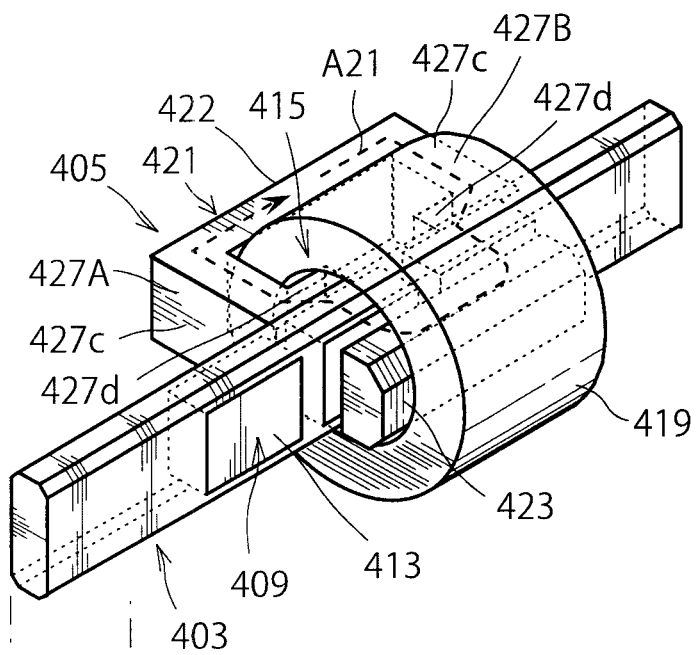
FIG. 11A is a perspective view schematically showing a structure of an electrical machine apparatus according to a fifth embodiment of the present invention.

FIG. 11A is a perspective view schematically showing the structure of an electrical machine apparatus according to a fifth embodiment of the present invention. The electrical machine apparatus according to the embodiment has the same structure as the electrical machine apparatus shown in FIGS. 7 to 9 except for the number of magnetic pole portions. Therefore, components in FIG. 11 that are the same as those of the electrical machine apparatus shown in FIGS. 7 to 9 are denoted by reference numerals obtained by adding 100 to the reference numerals affixed to their counterparts in FIGS. 7 to 9 and their descriptions are omitted. In the electrical machine apparatus according to the embodiment, the magnetic pole portions of a first magnetic pole portion assembly 415 are formed by an extending portion 427d of an auxiliary yoke 427A and the extending portion 427d of an auxiliary yoke 427B. The two extending portions 427d form discrete magnetic pole portions that magnetically form different magnetic poles. A second magnetic pole portion assembly 417 is formed by one magnetic pole portion 423.

Figure 11B:
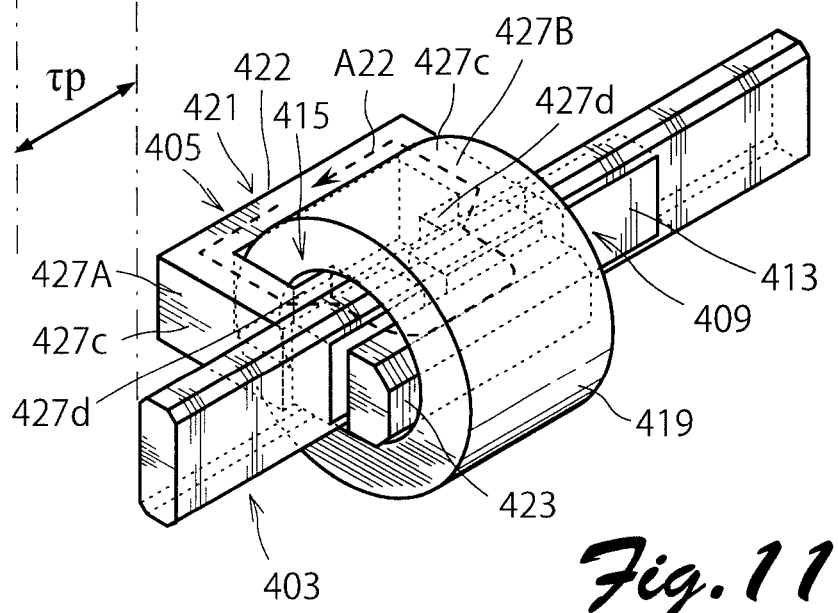
FIG. 11B illustrates how the electrical machine apparatus of FIG. 11A is operated.

Next, the manner of operation of the electrical machine apparatus according to the embodiment will be described. When a current flows through the winding 419 in one direction, as shown in FIG. 11A, magnetic flux flows in a meandering manner through the magnetic pole portions 427d and 423 in the order of the extending portion 427d of the auxiliary yoke 427B, the permanent magnet 413, the magnetic pole portion 423, the permanent magnet 413, and the extending portion 427d of the auxiliary yoke 427A. The magnetic flux flowing into the extending portion 427d of the auxiliary yoke 427A flows in the order of the auxiliary yoke 427A, the yoke body 422, and the auxiliary yoke 427B as indicated by arrow A21. Due to the magnetic flux, the magnetic pole portions 423 etc. and the permanent magnets 413 of the permanent magnet array 409 are attracted toward and repulsed from each other to move the mover 403 in the direction from the auxiliary yoke 427A to the auxiliary yoke 427B by the pitch (τp) of the plurality of permanent magnets 413 as shown in FIG. 11B. Next, in the state shown in FIG. 11B, a current flows through the winding 419 in the direction opposite to the state shown in FIG. 11A. This causes magnetic flux to flow in a meandering manner in the order of the extending portion 427d of the auxiliary yoke 427A, the permanent magnet 413, the magnetic pole portion 423, the permanent magnet 413, and the auxiliary yoke 427d of the auxiliary yoke 427B as shown in FIG. 11B in the direction opposite to the state shown in FIG. 11A. The magnetic flux flowing into the extending portion 427d of the auxiliary yoke 427B flows in the order of the auxiliary yoke 427B, the yoke body 422, and the auxiliary yoke 427A as indicated by arrow A22. Due to the flow of the magnetic flux, the mover 403 moves in the direction from the auxiliary yoke 427B to the auxiliary yoke 427A, or the direction in which the mover 403 returns to the original position, by the pitch ($\tau$p) of the plurality of permanent magnets 413. The mover 403 reciprocates with respect to the stator 405 by repeatedly switching between these states.

According to the electrical machine apparatus of the embodiment, the number of magnetic poles 423 etc. may be reduced to reduce the size of the electrical machine apparatus. The electrical machine apparatus according to the embodiment also may function as a generator by reciprocating the mover 403 with an external force.

Figure 12:
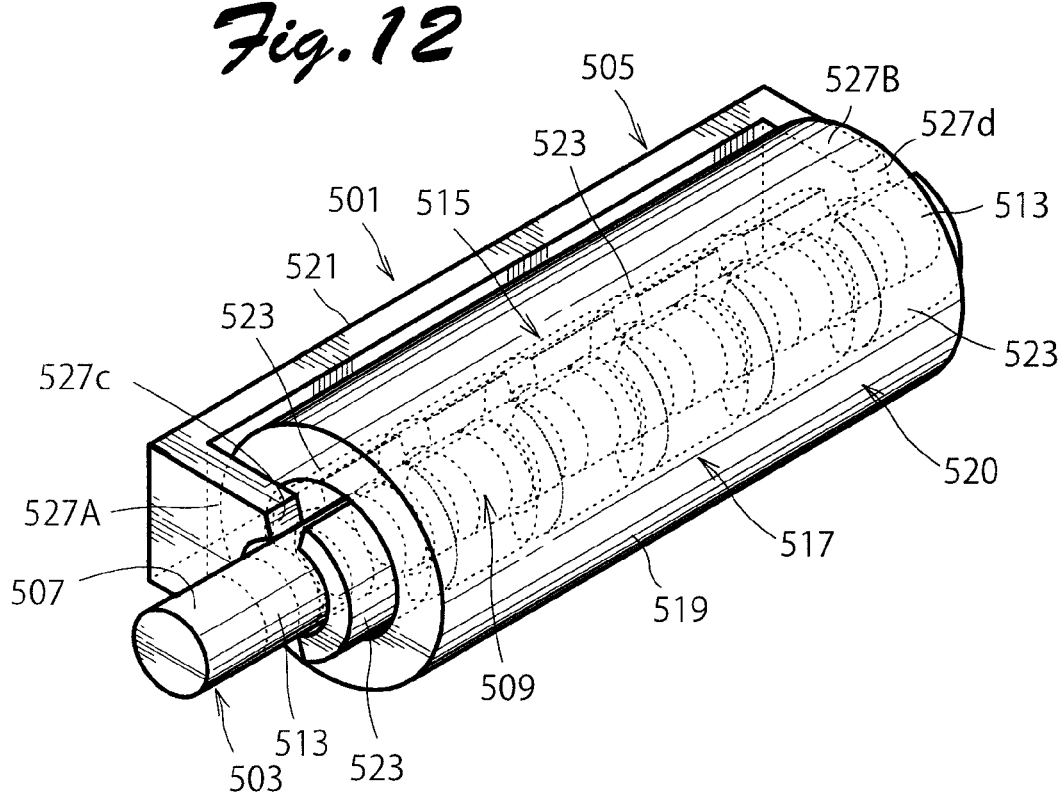
FIG. 12 is a perspective view schematically showing an internal structure of an electrical machine apparatus according to a sixth embodiment of the present invention.
Figure 13:
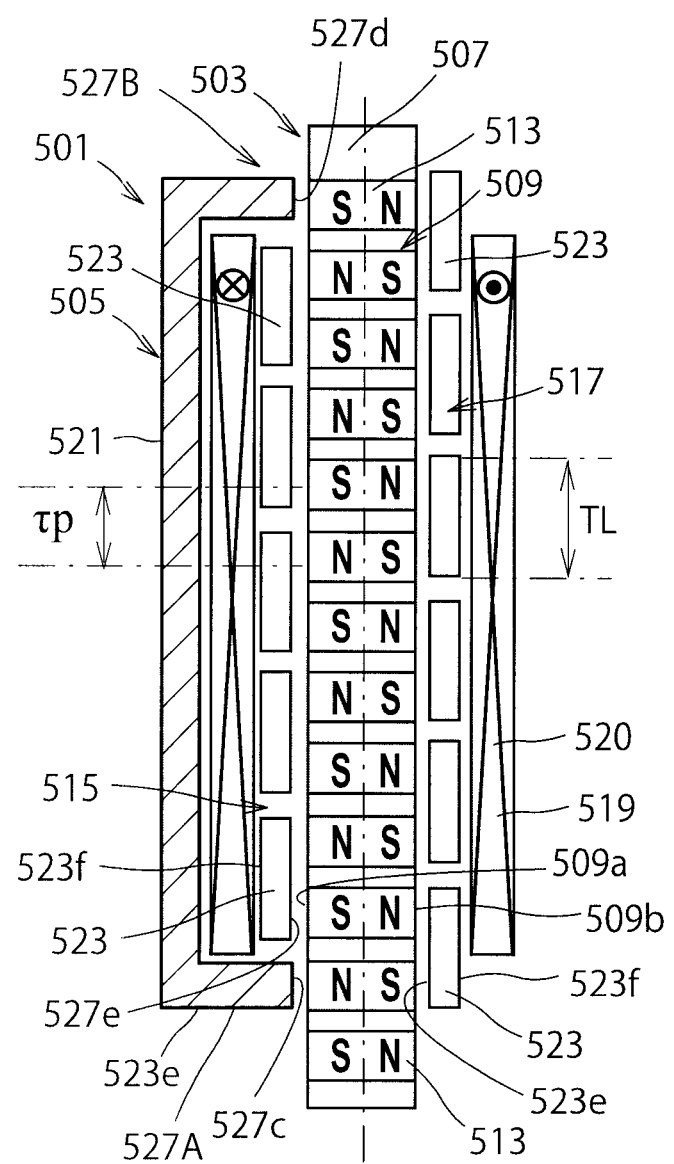
FIG. 13 is a cross-sectional view schematically showing the internal structure of the electrical machine apparatus of FIG. 12.

FIGS. 12 and 13 are respectively a perspective view and a cross-sectional view schematically showing the internal structure of an electrical machine unit 501 of an electrical machine apparatus according to a sixth embodiment of the present invention. The embodiment is different from the embodiment shown in FIGS. 7 to 9 in that a permanent magnet array 509 provided in a mover 503 is formed in a columnar shape and that the magnetic pole surface of each of magnetic pole portions 523 of first and second mover assemblies 515 and 517 is formed in an arcuate shape. Thus, components in the embodiment that are common to the embodiment shown in FIGS. 7 to 9 are denoted by reference numerals obtained by adding 200 to the reference numerals affixed to their counterparts in FIGS. 7 to 9 and their descriptions are omitted. The mover 503 includes a frame member 507 formed in a columnar shape and a permanent magnet array 509 formed by a plurality of permanent magnets each formed in a circular plate shape. The frame member 507 is formed from a non-magnetic material such as aluminum or a resin, and permanent magnets 513 each formed in a circular plate shape are disposed inside the frame member 507. In the embodiment, the frame member 507 is molded such that the plurality of permanent magnets 513 are disposed inside the frame member 507 with a gap therebetween. Alternatively, the mover 503 having a frame member may be formed by alternately disposing a plurality of permanent magnets and a plurality of non-magnetic spacers in a thin-walled stainless pipe and fixing the permanent magnets and the spacers using an adhesive. The plurality of permanent magnets 513 are magnetized in a perpendicular direction or a radial direction perpendicular to a motion direction of the mover 503 such that magnetic poles having different polarities alternately appear on magnetic pole surfaces of the plurality of permanent magnets 513 along the motion direction. The permanent magnet array 509 is thus formed by the plurality of permanent magnets 513 arranged in an array in the motion direction of the mover 503.

The stator 505 includes an armature unit 520 including a first magnetic pole portion assembly 515, a second magnetic pole portion assembly 517, and a winding 519, and a yoke member 521. The first magnetic pole portion assembly 515 includes five magnetic pole portions 523, and the second magnetic pole portion assembly 517 includes six magnetic pole portions 523. Each of the magnetic pole portions 523 is formed from iron which is a magnetic material, and the magnetic pole surface of each of the magnetic pole portions 523 is formed in an arcuate shape. Also in the embodiment, the first and second magnetic pole portion assemblies 515 and 517 and the permanent magnet array 509 are configured such that defining the length of each of the magnetic pole portions 523 as TL as measured in the motion direction, and defining the pitch between the centers of two adjacent permanent magnets 513 of the plurality of permanent magnets 513 forming the permanent magnet array 509 as $\tau$p, the relationship of $\tau p < TL < 2\tau p$ is established. The five magnetic pole portions 523 included in the first magnetic pole portion assembly 515 and the six magnetic pole portions 523 included in the second magnetic pole portion assembly 517 are disposed such that respective end portions of the magnetic poles of the magnetic pole portions 523 oppose each other via the mover 503, and such that the magnetic pole portions 523 included in one magnetic pole portion assembly of the first and second magnetic pole portion assemblies 515 and 517 are shifted or displaced in the motion direction with respect to the magnetic pole portions 523 included in the other magnetic pole portion assembly. In the embodiment, the magnetic pole portions 523 are shifted by the pitch ($\tau$p) of the permanent magnets 513.

Respective end surfaces of end portions 527c and 527d, facing the permanent magnet array 509, of the auxiliary yokes 527A and 527B provided at both ends of the yoke member 521 are also partly formed in an arcuate shape. The end portions 527c and 527d of the auxiliary yokes 527A and 527B facing the permanent magnet array 509 are disposed side by side with the five magnetic pole portions 523 included in the first magnetic pole portion assembly 515. The end portion 527c of the auxiliary yoke 527A and the end portion 527d of the auxiliary yoke 527B form part of the magnetic pole portions as with the magnetic pole portions 523. In the embodiment, the end portion 527c of the auxiliary yoke 527A and the end portion 527d of the auxiliary yoke 527B are not located in the internal space of the winding 519.

Next, operation of the electrical machine apparatus according to the embodiment will be described. When a current flows through the winding 519 in one direction, as shown in FIG. 14A, magnetic flux flows in a closed magnetic path through the magnetic pole portions 527c and 527d and 523A to 523K and the permanent magnets 513 in the order of the end portion 527d of the auxiliary yoke 527B, the permanent magnet 513, the magnetic pole portion 523F, the permanent magnet 513, the magnetic pole portion 523A, the permanent magnet 513, the magnetic pole portion 523G, . . . , the magnetic pole portion 523K, the permanent magnet 513, the end portion 527c of the auxiliary yoke 527A, and the yoke body 522 as indicated by arrows A31 and A32. Due to the magnetic flux passing through the closed magnetic path, magnetic poles appear on magnetic pole surfaces of the magnetic pole portions 527c and 527d and 523A to 523K. These magnetic poles and the magnetic poles appearing on the magnetic pole surfaces of the plurality of permanent magnets 513 are attracted toward and repulsed from each other to move the mover 503 in the direction from the auxiliary yoke 527A to the auxiliary yoke 527B by the pitch ($\tau$p) of the plurality of permanent magnets 513 as shown in FIG. 14B.

In the state shown in FIG. 14B, when a current flows through the winding 519 in the direction opposite to the state shown in FIG. 14A, a closed magnetic path in the direction opposite to the closed magnetic path shown in FIG. 12A is formed as shown in FIG. 14B.

When magnetic flux flows in the closed magnetic path as indicated by arrows A33 and A34, magnetic poles having polarities opposite to those in the state of FIG. 14A appear on magnetic pole surfaces of the magnetic pole portions 527c and 527*d* and 523A to 523K. These magnetic poles and the magnetic poles appearing on the magnetic pole surfaces of the permanent magnets 513 are attracted toward and repulsed from each other to move the mover 503 in the direction from the auxiliary yoke 527B to the auxiliary yoke 527A by the pitch (τp) of the plurality of permanent magnets 513 to the position shown in FIG. 14A. The mover 503 reciprocates with respect to the stator 505 by repeatedly switching between these states.

According to the electrical machine apparatus of the embodiment, the permanent magnets 513 and the mover 503 are formed in a columnar shape. Thus, the winding may be wound in the shortest path, which may reduce the copper loss and the required space. The electrical machine apparatus according to the embodiment also may be caused to function as a generator by reciprocating the mover 503 with an external force.

Figure 15A:
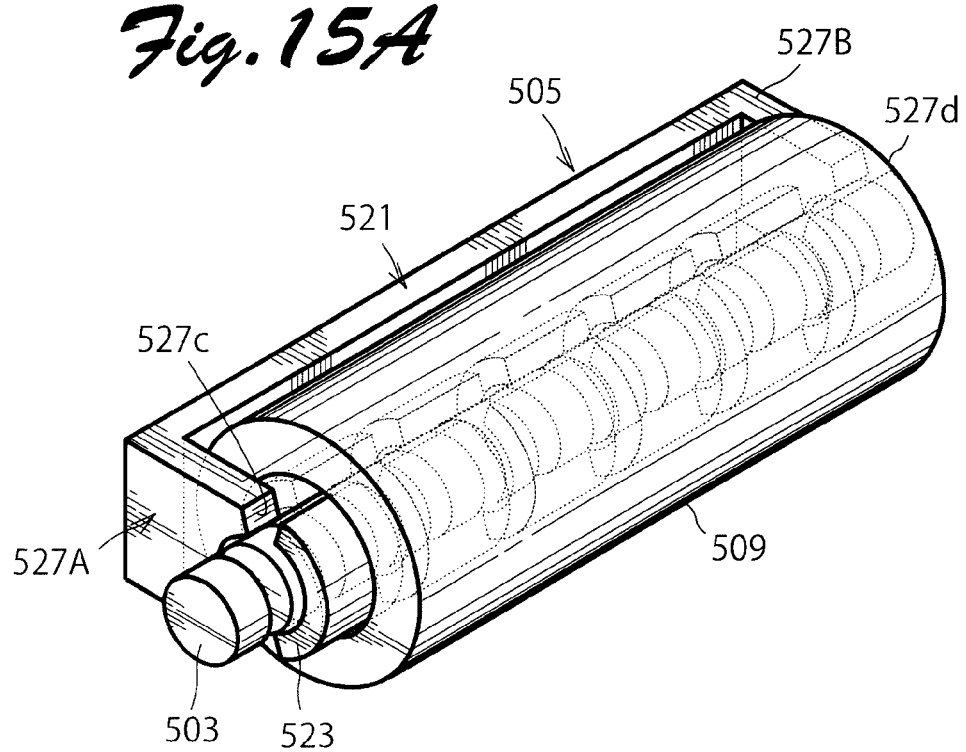
FIGS. 15A and 15B illustrate an exemplary support structure for a columnar mover of the electrical machine apparatus according to the embodiment shown in FIGS. 12 to 14.
Figure 15B:
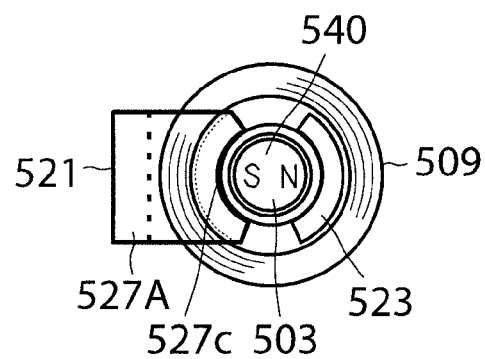

FIGS. 15A and 15B illustrate an exemplary support structure for the columnar mover 503 according to the embodiment shown in FIGS. 12 to 14. In the support structure, a resin ring 540 made of a low-friction sliding material is interposed between the end portion 527*c* of the auxiliary yoke 527A of the yoke member 521 and part of the magnetic pole surface of one magnetic pole portion 523. In addition, although not shown in FIGS. 15A and 15B, a resin ring 540 made of a low-friction sliding material is interposed between the end portion 527*d* of the auxiliary yoke 527B of the yoke member 521 and part of the magnetic pole surface of another magnetic pole portion 523. Thus, the columnar mover 503 is reciprocally supported by the pair of resin rings 540. Alternatively, thrust bearings made of a non-magnetic material may be used in place of the resin rings 540.

Figure 17:
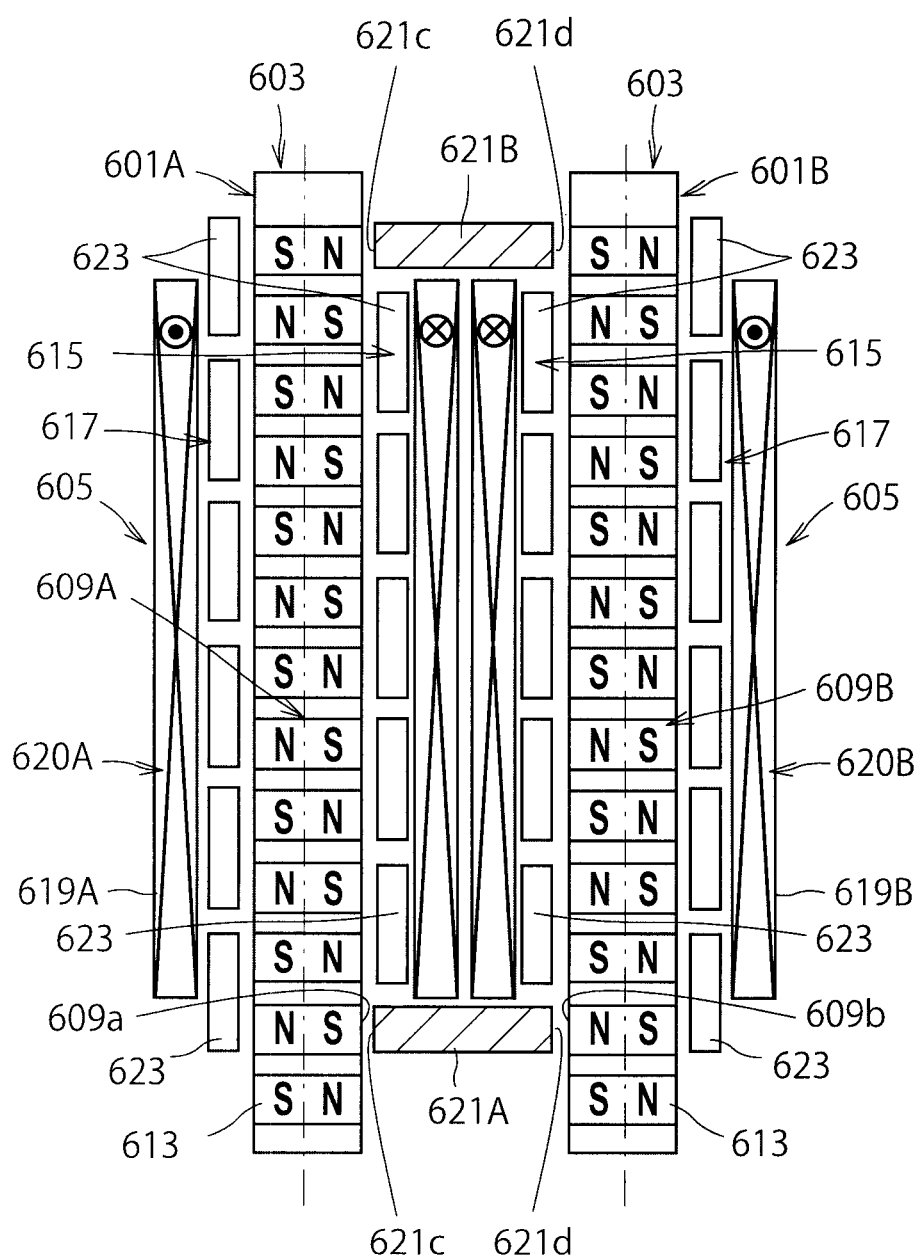
FIG. 17 is a cross-sectional view schematically showing the internal structure of the electrical machine apparatus of FIG. 16.

FIGS. 16 and 17 are respectively a perspective view and a cross-sectional view schematically showing the internal structure of an electrical machine apparatus according to a seventh embodiment of the present invention. The electrical machine apparatus according to the embodiment includes two electrical machine units (first and second electrical machine units 601A and 601B). In the electrical machine apparatus according to the embodiment, two movers 603 of the first and second electrical machine units 601A and 601B each have basically the same structure as the mover 503 shown in FIGS. 12 to 14. However, first and second permanent magnet arrays 609A and 609B of the first and second electrical machine units 601A and 601B are disposed in parallel with each other with a gap therebetween in the perpendicular direction, and shifted or displaced from each other by an electrical angle of 180°. Components that are the same as those of the mover of the electrical machine apparatus shown in FIGS. 12 to 14 are denoted by reference numerals obtained by adding 100 to the reference numerals affixed to their counterparts in FIGS. 12 to 14 and their descriptions are omitted. The stators 605 of the first and second electrical machine units 601A and 601B respectively include first and second armature units 620A and 620B that are each basically the same as the stator 505 shown in FIGS. 12 to 14. Components that are the same as those of the stator of the electrical machine apparatus shown in FIGS. 12 to 14 are denoted by reference numerals obtained by adding 100 to the reference numerals affixed to their counterparts in FIGS. 12 to 14 and their descriptions are omitted.

The first and second armature units 620A and 620B are disposed side by side in parallel with each other such that a first magnetic pole portion assembly 615 of the first armature unit 620A and the first magnetic pole portion assembly 615 of the second armature unit 620B are adjacent to each other. A winding 619A of the first armature unit 620A and a winding 619B of the second armature unit 620B are wound such that currents flowing through the windings 619A and 619B of the first and second armature units 620A and 620B have a phase difference corresponding to an electrical angle of 180°. First and second yoke members 621A and 621B are disposed on both sides of the first magnetic pole portion assembly 615 of the first armature unit 620A and the first magnetic pole portion assembly 615 of the second armature unit 620B in the motion direction to magnetically couple the first and second permanent magnet arrays 609A and 609B to each other.

One end portion 621*c* of the first yoke member 621A is disposed side by side with the magnetic pole portion 623 located at one end portion of the five magnetic pole portions 623 included in the first magnetic pole portion assembly 615 of the first armature unit 620A. The end portion 621*c* of the first yoke member 621A forms part of the magnetic pole portions to be excited by the winding 619A of the first armature unit 620A as with the magnetic pole portions 623. The other end portion 621*d* of the first yoke member 621A is disposed side by side with the magnetic pole portion 623 located at the other end portion of the five magnetic pole portions 623 included in the first magnetic pole portion assembly 615 of the second armature unit 620B. The end portion 621*d* of the first yoke member 621A forms part of the magnetic pole portions to be excited by the winding 619B of the second armature unit 620B. In the embodiment, both the end portions 621*c* and 621*d* of the first yoke member 621A are not located in the internal spaces of the windings 619A and 619B.

The second yoke member 621B is disposed between the other end portion of the first armature unit 620A in the motion direction and the other end portion of the second armature unit 620B in the motion direction. Both the end portions 621*c* and 621*d* of the second yoke member 621B also face the first permanent magnet array 609A of the first electrical machine unit 601A and the second permanent magnet array 609B of the second electrical machine unit 601B. One end portion 621*c* of the second yoke member 621B is disposed side by side with the magnetic pole portion 623 located at the other end portion of the five magnetic pole portions 623 included in the first magnetic pole portion assembly 615 of the first armature unit 620A. The end portion 621*c* of the second yoke member 621B forms part of the magnetic pole portions to be excited by the winding 619A of the first armature unit 620A. The other end portion 621*d* of the second yoke member 621B is disposed side by side with the magnetic pole portion 623 located at the other end portion of the five magnetic pole portions 623 included in the first magnetic pole portion assembly 615 of the second armature unit 620B. The end portion 621*d* of the second yoke member 621B forms part of the magnetic pole portions to be excited by the winding 619B of the second armature unit 620B. In the embodiment, both the end portions 621*c* and 621*d* of the second yoke member 621B are not located in the internal spaces of the windings 619A and 619B.

As shown in FIG. 16, one end portion of the mover 603 of the first electrical machine unit 601A and one end portion of the mover 603 of the second electrical machine unit 601B are coupled to each other via a coupling member 629A. Also, the other end portion of the mover 603 of the first electrical machine unit 601A and the other end portion of the mover 603 of the second electrical machine unit 601B are coupled to each other via a coupling member 629B.

As shown in FIG. 17, the first permanent magnet array 609A of the first electrical machine unit 601A and the second permanent magnet array 609B of the second electrical machine unit 601B are shifted or displaced from each other by an electrical angle of 180°. Specifically, the polarities of the permanent magnets 613 of the first permanent magnet array 609A of the first electrical machine unit 601A and the polarities of the permanent magnets 613 of the second permanent magnet array 609B of the second electrical machine unit 601B, which oppose each other via the first and second yoke members 621A and 621B, are opposite to each other.

In addition, the winding 619A of the first electrical machine unit 601A and the winding 619B of the second electrical machine unit 601B are excited with a phase difference corresponding to an electrical angle of 180°.

Figure 18C:
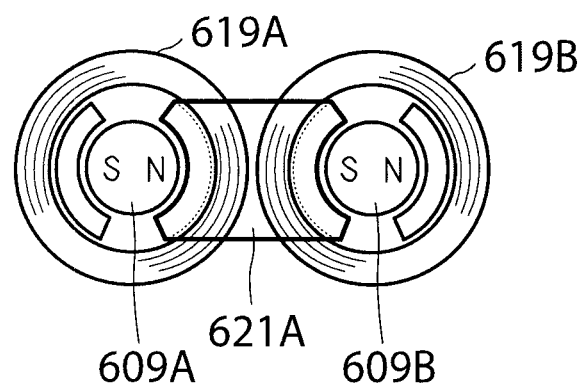

FIGS. 18A to 18C and FIGS. 19A and 19B show closed magnetic paths A41 and A42 formed when currents with a phase difference of 180° respectively flow through the windings 619A and 619B of the first and second armature units 620A and 620B according to the embodiment. As shown in FIG. 18A, a closed magnetic path A41 of magnetic flux produced when currents with a phase difference of 180° respectively flow through the windings 619A and 619B is formed by a magnetic path of magnetic flux flowing through the first and second magnetic pole portion assemblies 615 and 617 and the first permanent magnet array 609A of the first armature unit 620A in a meandering manner, a magnetic path of magnetic flux flowing through the second yoke member 621B, a magnetic path of magnetic flux flowing through the first and second magnetic pole portion assemblies 615 and 617 and the second permanent magnet array 609B of the second armature unit 620B in a meandering manner, and a magnetic path of magnetic flux flowing through the first yoke member 621A. When magnetic flux flows in the closed magnetic path described above, the magnetic pole portions 623 etc. and the plurality of permanent magnets 613 of the permanent magnet arrays 609A and 609B are attracted toward and repulsed from each other to move the mover 603 from the state of FIGS. 18A and 19A to the state of FIGS. 18B and 19B by the pitch (τp) of the permanent magnets 613. Next, as shown in FIGS. 18B and 19B, when currents flowing through the windings 619A and 619B are reversed in direction with respect to the state of FIG. 18A, a closed magnetic path A42 in which magnetic flux flows in the direction opposite to the magnetic flux flowing in the closed magnetic path A41 is formed. When such magnetic flux flows, the mover 603 moves from the state shown in FIGS. 18B and 19B to the state shown in FIGS. 18A and 19A by the pitch (τp) of the plurality of permanent magnets 613. The mover 603 reciprocates with respect to the stator 605 in each of the first and second electrical machine units 601A and 601B by repeatedly switching between these states.

According to the electrical machine apparatus of the embodiment, the magnetic pole portions 623 etc. of the two electrical machine units, namely the first and second electrical machine units 601A and 601B, may be combined to each other to obtain a high-thrust electrical machine apparatus.

The electrical machine apparatus according to the embodiment shown in FIGS. 16 to 19 also may function as a generator by vibrating the movers 603 with an external force by the pitch (τp). FIG. 20 is a perspective view schematically showing the internal structure of an electrical machine unit according to an eighth embodiment, which has basically the same structure as the embodiment shown in FIGS. 16 to 19 but in which the length of the first permanent magnet array 609A' and the second permanent magnet array 609B' is increased by n·τp. By increasing the length of the first permanent magnet array 609A' and the second permanent magnet array 609B' by n·τp in this way, the stroke of the movers 603' may be increased. A generator formed with this structure may induce a voltage of n cycles for one stroke of the movers, which may enhance the generation output.

Figure 21:
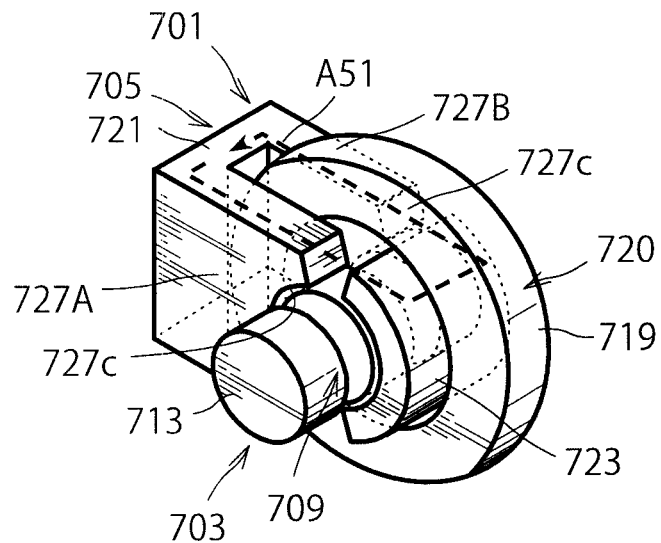
FIG. 21 is a perspective view schematically showing an internal structure of an electrical machine apparatus according to a ninth embodiment of the present invention.

FIG. 21 is a perspective view schematically showing the internal structure of an electrical machine unit of an electrical machine apparatus according to a ninth embodiment of the present invention. The electrical machine apparatus according to the embodiment has the same structure as the electrical machine apparatus shown in FIGS. 12 to 14 except for the number of permanent magnets and the number of magnetic pole portions. Therefore, components that are the same as those of the electrical machine apparatus shown in FIGS. 12 to 14 are denoted by reference numerals obtained by adding 200 to the reference numerals affixed to their counterparts in FIGS. 12 to 14 and their descriptions are omitted. In the electrical machine apparatus according to the embodiment, an end portion 727c of an auxiliary yoke 727A and an end portion 727c of an auxiliary yoke 727B, which form a first magnetic pole, are provided on one side of a permanent magnet array 709. A second magnetic pole portion 723 is provided on the other side of the permanent magnet array 709. A winding 719 has a hollow structure formed by winding a winding conductor into a coil such that part of a second magnetic pole portion 723 is located in the internal space of the winding 719.

Figure 22:
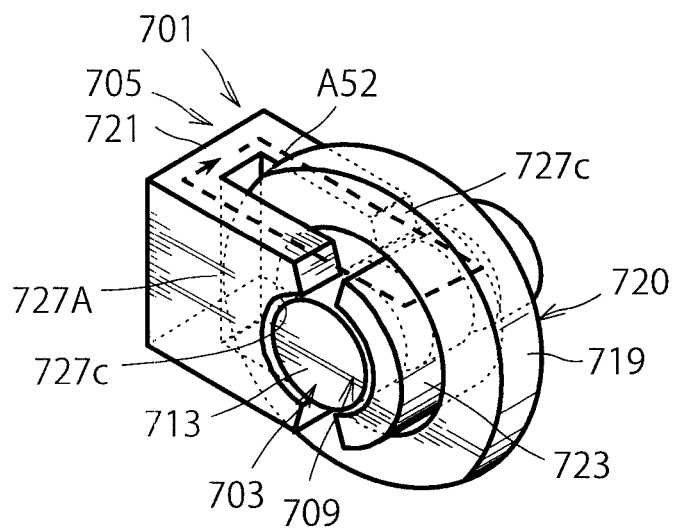
FIG. 22 illustrates how the electrical machine apparatus of FIG. 21 is operated.

Next, the manner of operation of the electrical machine apparatus according to the embodiment will be described. When a current flows through the winding 719 in one direction, as indicated by the arrow A51 of FIG. 21, magnetic flux flows in a closed magnetic path A51 in the order of an end portion 727c of an auxiliary yoke 727A, a permanent magnet 713, a magnetic pole portion 723, the permanent magnet 713, an end portion 727c of an auxiliary yoke 727B, an yoke body 722, and the auxiliary yoke 727A. When magnetic flux flows in the closed magnetic path A51, the end portion 727c of the auxiliary yoke 727A, the end portion 727c of the auxiliary yoke 727B, and the magnetic pole portion 723 and the permanent magnet array 709 are attracted toward and repulsed from each other to move the mover 703 in the direction from the auxiliary yoke 727A to the auxiliary yoke 727B by the pitch (τp) of the plurality of permanent magnets 713 as shown in FIG. 22. In the state shown in FIG. 22, a current flows in the direction opposite to the state shown in FIG. 21. Accordingly, as indicated by the arrow A52 of FIG. 22, magnetic flux flows in the direction opposite to the state shown FIG. 21 to form a closed magnetic path indicated by the arrow A52. When magnetic flux flows in the closed magnetic path shown in FIG. 22, the end portion 727c of the auxiliary yoke 727A, the end portion 727c of the auxiliary yoke 727B, and the magnetic pole portion 723 and the permanent magnets 731 of the permanent magnet array 709 are attracted toward and repulsed from each other to move the mover 703 in the direction from the auxiliary yoke 727B to the auxiliary yoke 727A, or the direction in which the mover 703 returns to the original position, by the pitch (τp) of the plurality of permanent magnets 713. The mover 703 reciprocates with respect to the stator 705 by repeatedly switching between these states.

According to the electrical machine apparatus of the embodiment, only one second magnetic pole portion 723 is located in the internal space of the winding 719, which may minimize the size of the electrical machine apparatus. The electrical machine apparatus according to the embodiment also may function as a generator by reciprocating the mover 703 with an external force.

Figure 23:
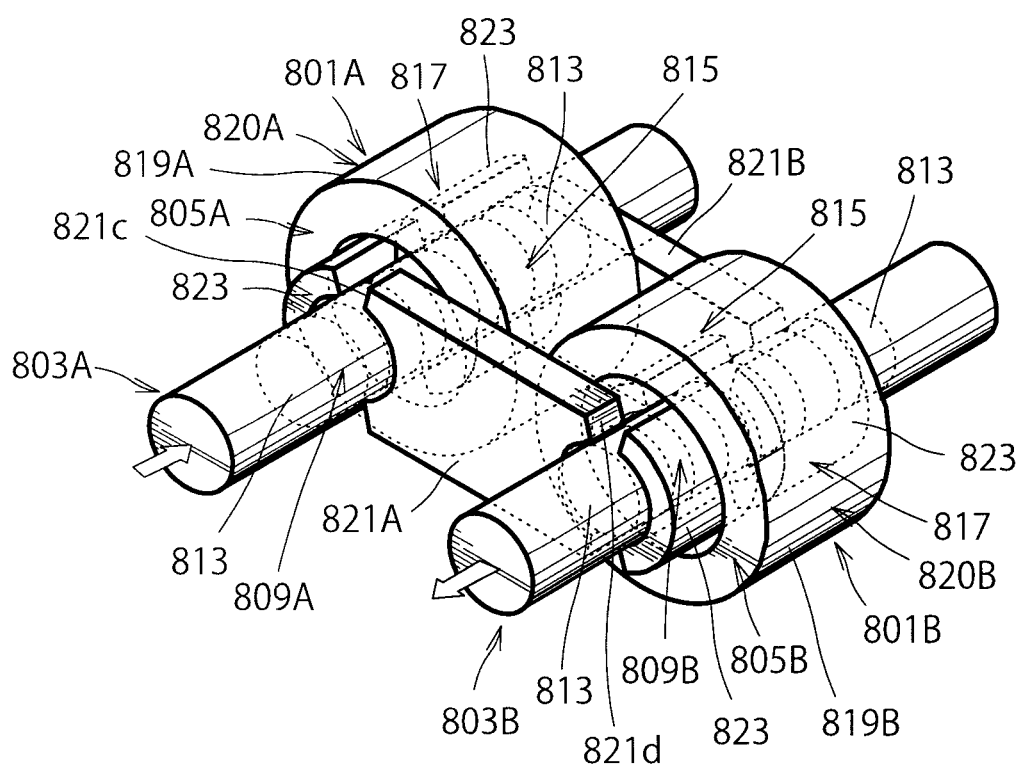
FIG. 23 is a perspective view schematically showing an internal structure of an electrical machine apparatus according to a tenth embodiment of the present invention.
Figure 24:
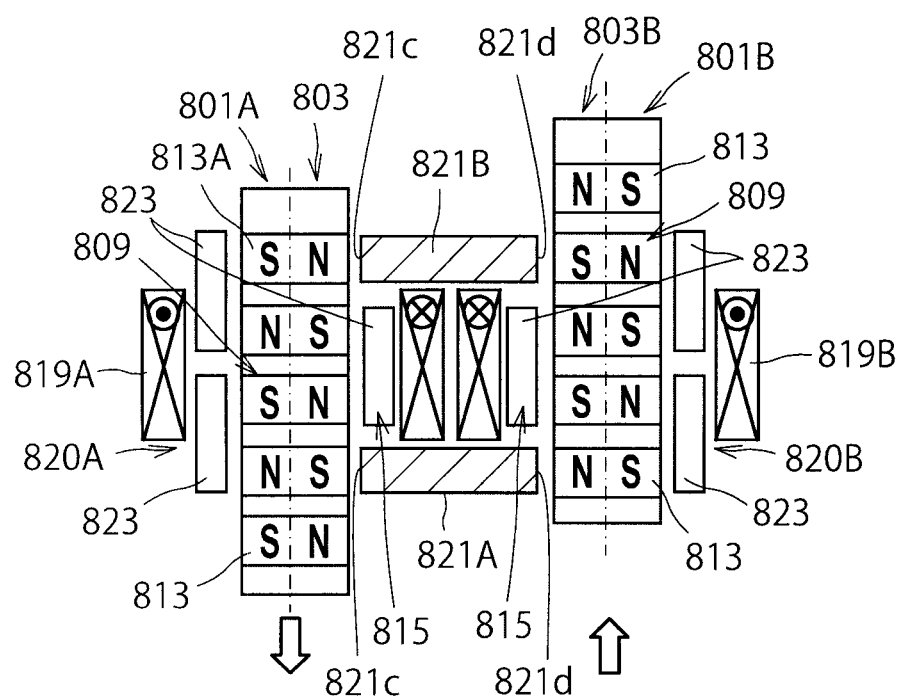
FIG. 24 is a cross-sectional view schematically showing the internal structure of the electrical machine apparatus of FIG. 23.

FIGS. 23 and 24 are respectively a perspective view and a cross-sectional view schematically showing the internal structure of an electrical machine unit of an electrical machine apparatus according to a tenth embodiment of the present invention. In the electrical machine apparatus according to the embodiment, first and second electrical machine units 801A and 801B are provided, and the mover 803A of the first electrical machine unit 801A and the mover 803B of the second electrical machine unit 801B reciprocate in opposite directions to each other. The electrical machine apparatus according to the embodiment is provided with no coupling members that are equivalent to the coupling members 629A and 629B of the electrical machine apparatus shown in FIGS. 16 to 19. Therefore, in other words, the movers 803A and 803B of the first and second electrical machine units 801A and 801B may move independently of each other. The electrical machine apparatus according to the embodiment is otherwise basically the same as the electrical machine apparatus shown in FIGS. 16 to 19 except that the magnetizing direction of the permanent magnet array of one of the movers is opposite to the magnetizing direction of the permanent magnet array of the other mover. Therefore, components in the embodiment that are the same as those of the movers of the electrical machine apparatus shown in FIGS. 16 to 19 are denoted by reference numerals obtained by adding 300 to the reference numerals affixed to their counterparts in FIGS. 16 to 19 and their descriptions are omitted.

Also in the embodiment, the first and second yoke members 821A and 821B contribute to forming a closed magnetic path in which magnetic flux produced by the windings 819A and 819B flows. The first and second electrical machine units 801A and 801B are disposed in parallel with each other such that the first magnetic pole portion assembly 815 of the first armature unit 820A and the first magnetic pole portion assembly 815 of the second armature unit 820B oppose each other via the windings. An end portion 821c of the first yoke member 821A forms part of the magnetic pole portions to be excited by the winding 819A of the first armature unit 801A. The end portions 821c and 821d of the first yoke member 821A and the end portions 821c and 821d of the second yoke member 821B respectively form the magnetic pole portions of the stators 805A and 805B as with the magnetic pole portions 823 when excitation currents flow through the windings 819A and 819B to cause magnetic flux to flow in a closed magnetic path. The magnetic pole portions thus formed by the end portions 821c and 821d of the first yoke member 821A and the end portions 821c and 821d of the second yoke member 821B are not located in the internal spaces of the windings 819A and 819B.

The permanent magnet array 809A of the first electrical machine unit 801A and the permanent magnet array 809B of the second electrical machine unit 801B are shifted or displaced from each other in the motion direction by one permanent magnet 813. Shifted or displaced by one permanent magnet 813, the permanent magnet array 809A of the first electrical machine unit 801A and the permanent magnet array 809B of the second electrical machine unit 801B are shifted or displaced from each other by an electrical angle of 180°. Specifically, one permanent magnet 813 of the permanent magnet array 809A of the first electrical machine unit 801A is disposed side by side with one permanent magnet 813 of the permanent magnet array 809B of the second electrical machine unit 801B having the opposite polarity. Currents with a phase difference corresponding to an electrical angle of 180° flow through the winding 819A of the first armature unit 820A and the winding 819B of the second armature unit 820B.

Figure 25:
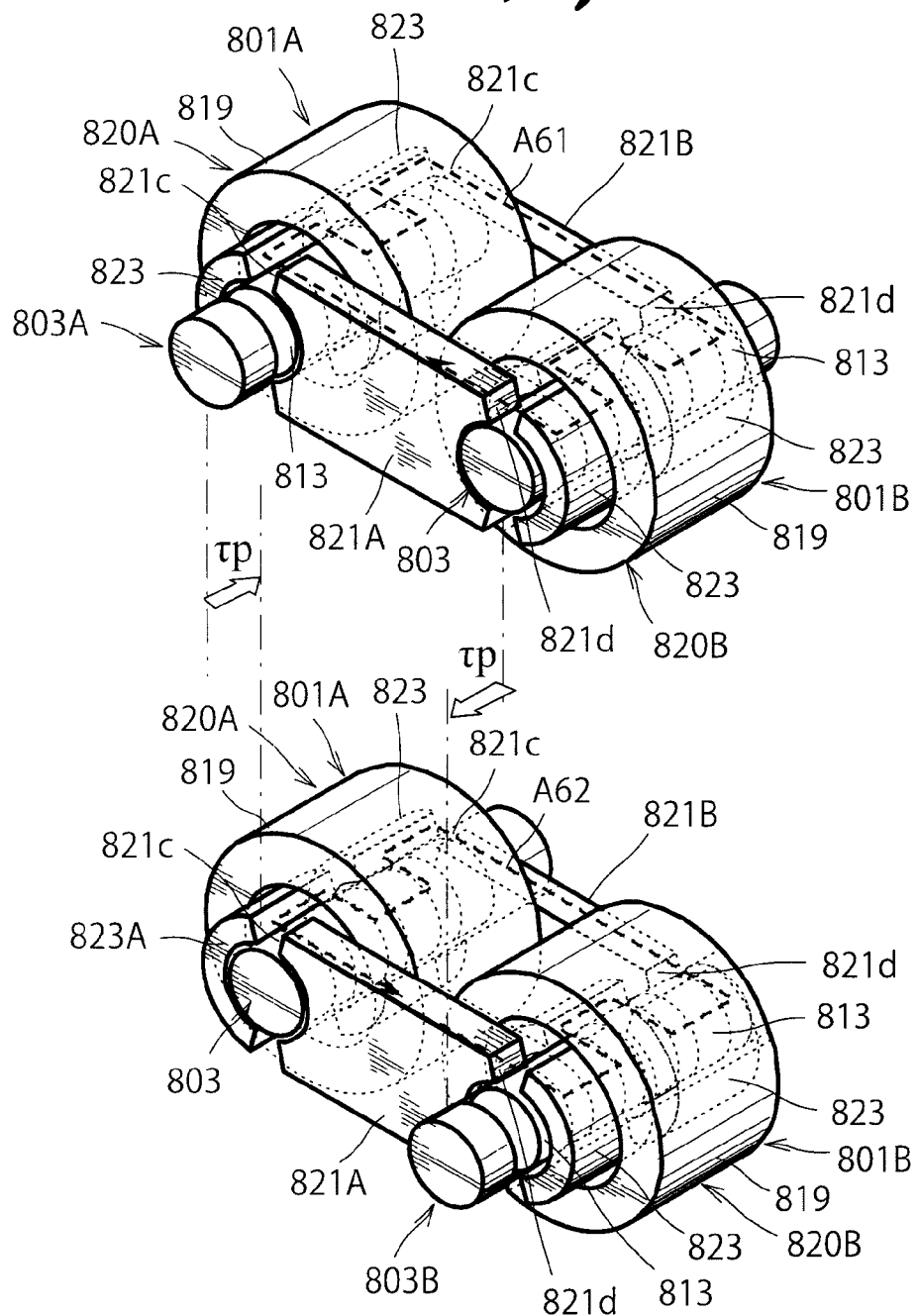
FIGS. 25A and 25B illustrate how the electrical machine apparatus of FIG. 23 is operated.

When currents with a phase difference corresponding to an electrical angle of 180° respectively flow through the winding 819A of the first armature unit 820A and the winding 819B of the second armature unit 820B in the state of FIG. 24, magnetic flux flows from the end portion 821c of the first yoke member 821A to the end portion 821c of the second yoke member 821B alternately through the permanent magnets 813 of the first electrical machine unit 801A and the magnetic pole portions 823 of the first armature unit 820A to form a closed magnetic path indicated by the arrow A61 of FIG. 25A in a meandering manner. The magnetic flux flowing into the end portion 821c of the second yoke member 821B flows from the opposite end portion 821d of the second yoke member 821B to the end portion 821d of the first yoke member 821A alternately through the permanent magnets 813 of the second electrical machine unit 801B and the magnetic pole portions 823 of the second armature unit 820B in a meandering manner. The magnetic flux flowing into the end portion 821d of the first yoke member 821A flows from the opposite end portion 821c of the first yoke member 821A to the magnetic pole portion 823 of the first electrical machine unit 801A. When magnetic flux flows in such a closed magnetic path, as shown in FIG. 25A and then in FIG. 25B, the mover 803A moves in the direction from the first yoke member 821A to the second yoke member 821B by the pitch (τp) of the permanent magnets 813, and the mover 803B moves in the direction from the second yoke member 821B to the first yoke member 821A by the pitch (τp) of the permanent magnets 813. In the state shown in FIG. 25B, when currents in opposite directions flow through the windings 819A and 819B, magnetic flux flows in a closed magnetic path indicated by the arrow A62 of FIG. 25B to move the mover 803A of the first electrical machine unit 801A in the direction from the second yoke member 821B to the first yoke member 821A, or the direction in which the mover 803A returns to the original position, by the pitch (τp) of the permanent magnets 813, and to move the mover 803B of the second electrical machine unit 801B in the direction from the first yoke member 821A to the second yoke member 821B, or the direction in which the mover 803B returns to the original position, by the pitch (τp) of the permanent magnets 813.

In the electrical machine apparatus according to the embodiment, both the mover 803A of the first electrical machine unit 801A and the mover 803B of the second electrical machine unit 8018 may be connected to a load, or only one of the movers 803A and 803B may be connected to a load.

According to the electrical machine apparatus of the embodiment, vibration of the mover 803A of the first electrical machine unit 801A and vibration of the mover 803B of the second electrical machine unit 801B cancel each other to reduce vibration of the entire electrical machine apparatus.

The electrical machine apparatus according to the embodiment also may function as a generator that induces a voltage in the windings 819A and 819B to generate electric power by reciprocating the movers 803A and 803B in opposite directions with an external force. In the generator, the windings 819A and 819B may be connected to each other by inverse parallel connection to take out alternating electric power.

Figure 26:
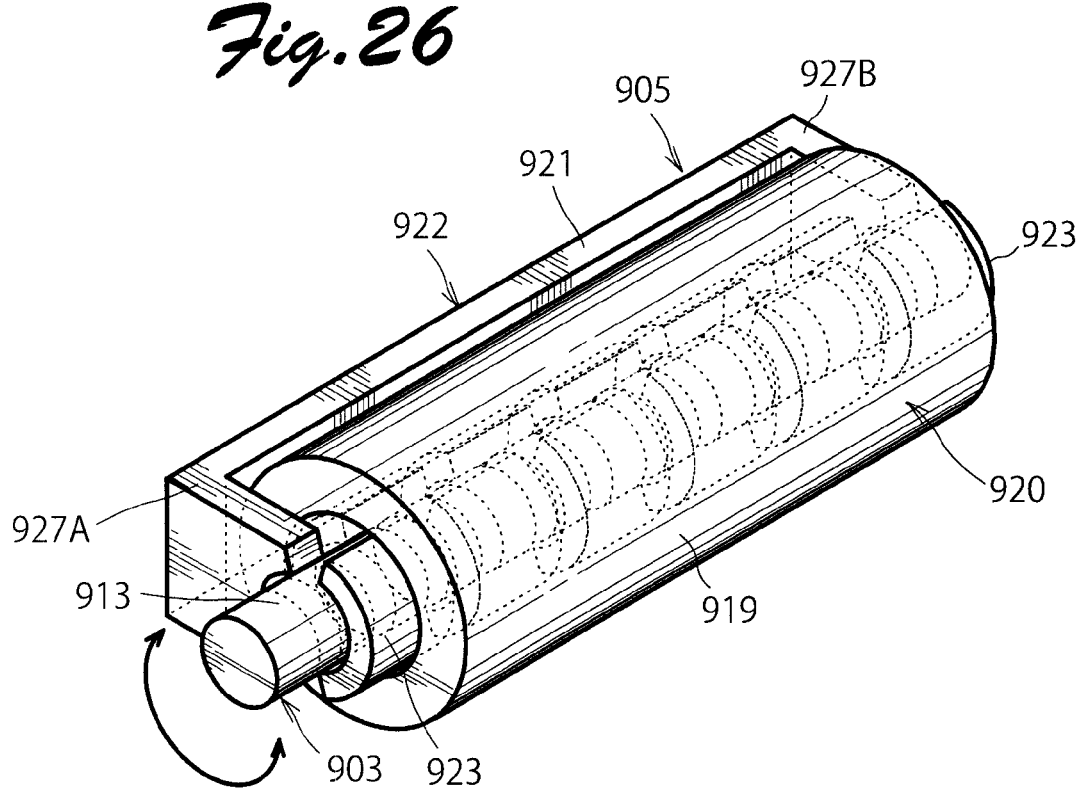
FIG. 26 is a perspective view schematically showing a structure of an electrical machine unit of an electrical machine apparatus according to an eleventh embodiment of the present invention.
Figure 27C:
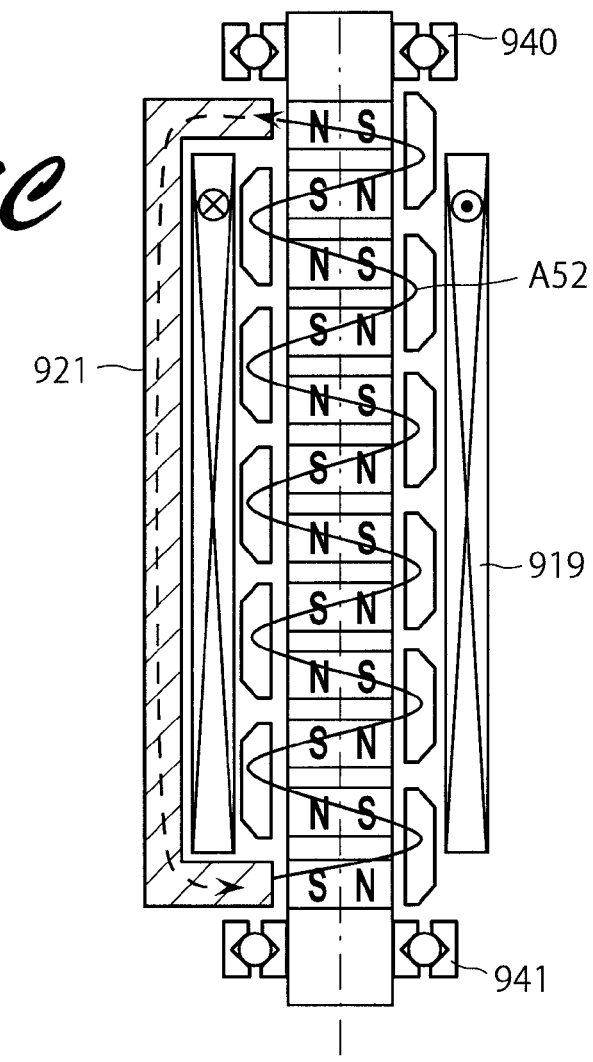
Figure 27D:
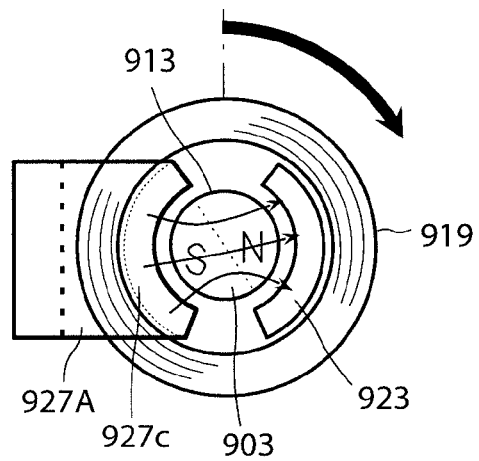

FIG. 26 is a perspective view schematically showing the structure of an electrical machine unit of an electrical machine apparatus according to an eleventh embodiment of the present invention. FIGS. 27A to 27D illustrate magnetic flux flow and operation according to the embodiment. The electrical machine apparatus according to the embodiment is very similar in structure to the electrical machine apparatus according to the embodiment shown in FIGS. 12 to 14. While the mover 503 reciprocates in the direction in which the mover 503 extends in the electrical machine apparatus according to the embodiment shown in FIGS. 12 to 14, a mover 903 rotates or swings over a predetermined angular range about the center line of the mover 903 in the electrical machine apparatus according to the embodiment. The electrical machine apparatus according to the embodiment is otherwise basically the same as the electrical machine apparatus shown in FIGS. 14 to 17. Components in FIGS. 26 and 27 that are the same as those of the embodiment shown in FIGS. 14 to 17 are denoted by reference numerals obtained by adding 400 to the reference numerals affixed to their counterparts in FIGS. 14 to 17 and their descriptions are omitted. The electrical machine apparatus according to the embodiment is different from the electrical machine apparatus according to the embodiment shown in FIGS. 14 to 17 in that both ends of the columnar mover 903 are rotatably supported by ball bearings 940 and 941. As shown in FIG. 27A, when a current flows through a winding 919, magnetic flux flows in a closed magnetic path A51 including a meandering magnetic path. In this case, as shown in FIG. 27B, magnetic flux flows between an auxiliary yoke 927A of an yoke member 921 and a magnetic pole portions 923 in the direction indicated in the drawing, which causes the mover 903 to rotate in the direction indicated by the arrow in the drawing namely, counterclockwise. Then, as shown in FIG. 27C, when a current flows in the opposite direction through the winding 919, magnetic flux flows in the opposite direction in a closed magnetic path A52 including a meandering magnetic path. In this case, as shown in FIG. 27D, magnetic flux flows between the auxiliary yoke 927A of the yoke member 921 and the magnetic pole portions 923 in the direction indicated in the drawing, which causes the mover 903 to rotate in the direction indicated by the arrow in the drawing, namely, clockwise. Thereafter, the rotational direction of the mover 903 is changed each time the direction of the current flowing through the winding 919 is changed, which causes the mover 903 to rotate within a predetermined angular range about the center line of the mover 903. In the electrical machine apparatus according to the embodiment structured as described above, if the mover 903 is swung within the foregoing angular range, an alternating voltage is induced in the winding 919 so that the electrical machine apparatus serves as an alternating-current generator. If the mover 903 is continuously rotated in one direction, meanwhile, a direct voltage is induced in the winding 919 so that the electrical machine apparatus serves as a direct-current generator.

In the electrical machine apparatus according to each of the embodiments described above, the unit including a permanent magnet array serves as a mover, and the armature unit including a winding serves as a stator. However, it is theoretically possible that the unit including a permanent magnet array may serve as a stator, and that the armature unit may serve as a mover.

While certain features of the invention have been described with reference to example embodiments, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. An electrical machine apparatus comprising:
   a stator; and
   a mover that reciprocates with respect to the stator,
   one of the stator and the mover comprising one or more permanent magnet arrays each including a plurality of permanent magnets arranged in an array in a motion direction in which the mover reciprocates, the plurality of permanent magnets being magnetized such that magnetic poles having different polarities appear on two magnetic pole surfaces of each permanent magnet that are opposite each other in a perpendicular direction perpendicular to the motion direction, and the plurality of permanent magnets being disposed such that magnetic poles having different polarities alternately appear on magnetic pole surfaces of the permanent magnets in the permanent magnet array along the motion direction, and
   the other of the stator and the mover comprising:
      one or more armature units each including:
         a first magnetic pole portion assembly including two or more magnetic pole portions facing the magnetic pole surfaces of the permanent magnet array and disposed in the perpendicular direction and on one side of the permanent magnet array;
         a second magnetic pole portion assembly including one or more magnetic pole portions facing the magnetic pole surfaces of the permanent magnet array and disposed in the perpendicular direction and on the other side of the permanent magnet array, the one or more magnetic pole portions included in the second magnetic pole portion assembly being shifted in the motion direction with respect to the two or more magnetic pole portions included in the first magnetic pole portion assembly; and
         a single phase winding having a hollow structure formed by winding a winding conductor into a coil around a centerline of winding such that the two or more magnetic pole portions included in the first magnetic pole portion assembly, the one or more magnetic pole portions included in the second magnetic pole portion assembly, and a part of one permanent magnet array are located in an internal space of the winding and that the centerline of winding extends in the motion direction in which the mover reciprocates; and
      one or more yoke members disposed such that magnetic flux alternately flowing through the permanent magnets in the one or more permanent magnet arrays that are positioned in the internal space of the winding and the first and second magnetic pole portion assemblies forms a closed magnetic path and that the magnetic flux flows through two magnetic surfaces of each permanent magnet in the internal space of the winding, where one of the magnetic pole portions of the first and second magnetic pole portion assemblies are completely separated from the one or more yoke members so that the one of the magnetic pole portions does not directly contact the one or more yoke members.

2. The electrical machine apparatus according to claim 1, wherein
   the two or more magnetic pole portions included in the first magnetic pole portion assembly are shifted in the motion direction with respect to the one or more magnetic pole portions included in the second magnetic pole portion assembly by a pitch ($\tau p$) between the centers of two adjacent permanent magnets of the plurality of permanent magnets forming the permanent magnet array.

3. The electrical machine apparatus according to claim 2, wherein
   defining a length of each of the magnetic pole portions forming the first and second magnetic pole portion assemblies as TL as measured in the motion direction, a relationship of $\tau p < TL < 2\tau p$ is established.

4. The electrical machine apparatus according to claim 1, wherein
   the permanent magnets are each formed in a short plate shape and the permanent magnet arrays are each formed in a long plate shape; and the magnetic pole portions each have a flat magnetic pole surface facing the permanent magnet array.

5. The electrical machine apparatus according to claim 1, wherein
the permanent magnets are each formed in a circular plate shape and the permanent magnet arrays are each formed in a columnar shape; and
the magnetic pole surface of each of the magnetic pole portions that faces the permanent magnet array is formed in an arcuate shape.

6. The electrical machine apparatus according to claim 1, wherein
the first and second magnetic pole portion assemblies and the winding are molded with an electrical insulating resin.

7. The electrical machine apparatus according to claim 1, wherein
there is one permanent magnet array;
there is one armature unit; and
there is one yoke member, the yoke member being disposed outside the winding, the yoke member including a yoke body extending in the motion direction and a pair of auxiliary yokes provided at both ends of the yoke body and facing the permanent magnet array.

8. The electrical machine apparatus according to claim 7, wherein
the pair of auxiliary yokes each include an extending portion extending into the internal space of the winding; and
the extending portion forms at least part of the two or more magnetic pole portions of the first magnetic pole portion assembly.

9. The electrical machine apparatus according to claim 1, wherein
the pitch of the plurality of permanent magnets and the amount of shift between the two or more magnetic pole portions of the first magnetic pole portion assembly and the one or more magnetic pole portions of the second magnetic pole portion assembly are determined such that a meandering magnetic path is formed in part of the closed magnetic path, the meandering magnetic path sequentially passing through a first permanent magnet in the permanent magnet array, a first magnetic pole portion of the first magnetic pole portion assembly, a second permanent magnet in the permanent magnet array located adjacent to the first permanent magnet, a first magnetic pole portion of the second magnetic pole portion assembly, a third permanent magnet in the permanent magnet array located adjacent to the second permanent magnet, a second magnetic pole portion of the first magnetic pole portion assembly located adjacent to the first magnetic pole portion of the first magnetic pole portion assembly, and a fourth permanent magnet in the permanent magnet array located adjacent to the third permanent magnet.

10. The electrical machine apparatus according to claim 1, wherein
the one or more permanent magnet arrays include first and second permanent magnet arrays disposed in parallel with each other with a gap therebetween in the perpendicular direction and shifted from each other by an electrical angle of 180°;
the one or more armature units include first and second armature units respectively corresponding to the first and second permanent magnet arrays;
the first magnetic pole portion assembly of the first armature unit and the first magnetic pole portion assembly of the second armature unit are disposed adjacent to each other;
the winding of the first armature unit and the winding of the second armature unit are wound such that currents flowing through the windings of the first and second armature units have a phase difference corresponding to an electrical angle of 180°; and
the one or more yoke members include first and second yoke members disposed on both sides of the first magnetic pole portion assembly of the first armature unit and the first magnetic pole portion assembly of the second armature unit in the motion direction to magnetically couple the first and second permanent magnet arrays to each other.

11. The electrical machine apparatus according to claim 10, wherein
the first permanent magnet array and the second permanent magnet array are mechanically coupled to each other.

12. The electrical machine apparatus according to claim 10, wherein
the first permanent magnet array and the second permanent magnet array are disposed to be movable independently of each other.

13. The electrical machine apparatus according to claim 1, wherein
the mover includes the one or more permanent magnet arrays and the stator includes the one or more armature units; and
the stator is provided with a mover support mechanism that supports the mover to allow the mover to move in the motion direction.

14. The electrical machine apparatus according to claim 13, wherein
the mover is formed in a rail-like shape; and
the mover support mechanism includes a pair of guide mechanisms disposed outside the armature unit to contact the mover to allow the mover to move in the motion direction with little frictional resistance.

15. The electrical machine apparatus according to claim 13, wherein
the mover support mechanism includes a pair of plate spring members fixed to both ends of the mover in the motion direction, and a fixing structure that fixes the pair of plate spring members to the stator.

16. The electrical machine apparatus according to claim 13, wherein
the mover is formed in a columnar shape; and
the mover support mechanism includes a pair of thrust bearings disposed at both ends of the first and second magnetic pole portion assemblies of the armature unit in the motion direction to support the mover.

17. An electrical machine apparatus comprising:
a stator; and
a mover that rotates with respect to the stator over a predetermined angular range,
the mover comprising a permanent magnet array including a plurality of permanent magnets arranged in a straight line, the plurality of permanent magnets being magnetized such that magnetic poles having different polarities appear on two magnetic pole surfaces of each permanent magnet that are opposite each other in a perpendicular direction perpendicular to an extending direction in which the permanent magnet array extends, and the plurality of permanent magnets being disposed such that magnetic poles having different polarities alternately appear on magnetic pole surfaces of each permanent magnets in the permanent magnet array along the extending direction, and the stator comprising:
an armature unit including:
- a first magnetic pole portion assembly including two or more magnetic pole portions facing the magnetic pole surfaces of the permanent magnet array and disposed in the perpendicular direction and on one side of the permanent magnet array;
- a second magnetic pole portion assembly including two or more magnetic pole portions facing the magnetic pole surfaces of the permanent magnet array and disposed in the perpendicular direction and on the other side of the permanent magnet array, the two or more magnetic pole portions included in the second magnetic pole portion assembly being shifted in the extending direction with respect to the two or more magnetic pole portions included in the first magnetic pole portion assembly; and
- a single phase winding having a hollow structure formed by winding a winding conductor into a coil such that the two or more magnetic pole portions included in the first magnetic pole portion assembly, the two or more magnetic pole portions included in the second magnetic pole portion assembly, and the permanent magnet array are located in an internal space of the winding and that the centerline of winding extends in the extending direction of the permanent magnet array; and a yoke member disposed such that magnetic flux flowing through the permanent magnet array and the first and second magnetic pole portion assemblies forms a closed magnetic path and that the magnetic flux flows through the two magnetic pole surfaces of each permanent magnet, wherein the mover is formed in a columnar shape, and both ends of the mover in the extending direction are rotatably supported by a mover support mechanism.

* * * * *